United States Patent
Gerstler et al.

(10) Patent No.: US 12,209,813 B2
(45) Date of Patent: Jan. 28, 2025

(54) HEAT EXCHANGER INCLUDING FURCATING UNIT CELLS

(71) Applicant: General Electric Company, Schenectady, NY (US)

(72) Inventors: William Dwight Gerstler, Niskayuna, NY (US); Daniel Jason Erno, Clifton Park, NY (US); Michael Thomas Kenworthy, Beavercreek, OH (US); Jeffrey Douglas Rambo, Mason, OH (US); Nicolas Kristopher Sabo, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/545,391

(22) Filed: Dec. 19, 2023

(65) Prior Publication Data

US 2024/0159471 A1 May 16, 2024

Related U.S. Application Data

(60) Division of application No. 16/988,314, filed on Aug. 7, 2020, now Pat. No. 11,892,245, which is a
(Continued)

(51) Int. Cl.
*F28D 7/16* (2006.01)
*F28F 1/02* (2006.01)

(52) U.S. Cl.
CPC ............ *F28D 7/1623* (2013.01); *F28F 1/022* (2013.01)

(58) Field of Classification Search
CPC ...... F28F 13/06; F28F 7/02; F28F 9/02; F28F 9/0229; F28F 13/00; F28F 13/02;
(Continued)

(56) References Cited

U.S. PATENT DOCUMENTS

| 3,228,464 | A | 1/1966 | Stein et al. |
| 3,548,932 | A | 12/1970 | Menkus |

(Continued)

FOREIGN PATENT DOCUMENTS

| CN | 102721303 B | 4/2014 |
| EP | 1777479 A2 | 4/2007 |

(Continued)

OTHER PUBLICATIONS

Biswas (Heat transfer and flow structure in laminar and turbulent flows in a rectangular channel with longitudinal vortices) (Year: 1994).
(Continued)

*Primary Examiner* — Gordon A Jones
(74) *Attorney, Agent, or Firm* — Dinsmore & Shohl LLP

(57) ABSTRACT

A heat exchanger is provided that can include furcating unit cells coupled with each other. Each of the unit cells can be elongated along an axis and include a sidewall that defines annular ring openings on opposite ends of the unit cell along the axis. The sidewall also can define undulating annular rings between the annular ring openings and axially separated from each other along the axis. The sidewall can further define angled openings into the unit cell both above and below each of the undulating annular rings. At least a first opening of the annular ring openings and the angled openings can be configured to be an inlet to receive a first fluid into the unit cell and at least a second opening of the annular ring openings and the angled openings configured to be an outlet through which the first fluid exits the unit cell.

20 Claims, 17 Drawing Sheets

Related U.S. Application Data continuation-in-part of application No. 15/077,191, filed on Mar. 22, 2016, now Pat. No. 10,739,077, which is a continuation-in-part of application No. PCT/US2015/054115, filed on Oct. 6, 2015.

(60) Provisional application No. 62/060,719, filed on Oct. 7, 2014.

(58) Field of Classification Search
CPC ... F28F 2009/029; F28F 2210/02; F02C 7/14; F28D 7/0008; F28D 9/00; F28D 9/0012; F28D 9/02; F28D 2021/0026
See application file for complete search history.

(56) References Cited

U.S. PATENT DOCUMENTS

| | | | |
|---|---|---|---|
| 4,149,591 A | 4/1979 | Albertsen | |
| 4,343,354 A | 8/1982 | Weber | |
| 4,784,218 A | 11/1988 | Holl | |
| 4,915,164 A | 4/1990 | Harper, Jr. | |
| 6,877,552 B1 | 4/2005 | King | |
| 7,044,207 B1 | 5/2006 | Guidat et al. | |
| 7,069,980 B2 | 7/2006 | Hofbauer | |
| 7,866,377 B2 | 1/2011 | Slaughter | |
| 7,871,578 B2 | 1/2011 | Schmidt | |
| 8,015,832 B2 | 9/2011 | Setoguchi et al. | |
| 8,235,101 B2 | 8/2012 | Taras et al. | |
| 8,240,365 B2 | 8/2012 | Obana et al. | |
| 8,794,820 B2 | 8/2014 | Mathys et al. | |
| 9,134,072 B2 | 9/2015 | Roisin et al. | |
| 9,440,216 B2 | 9/2016 | Ryan | |
| 2005/0006064 A1 | 1/2005 | Garimella | |
| 2005/0016721 A1 | 1/2005 | Antonijevic et al. | |
| 2006/0245987 A1 | 11/2006 | Schmidt | |
| 2008/0149299 A1 | 6/2008 | Slaughter | |
| 2010/0270011 A1 | 10/2010 | Takahashi et al. | |
| 2013/0139541 A1 | 6/2013 | Seybold et al. | |
| 2013/0206374 A1 | 8/2013 | Roisin et al. | |
| 2013/0276469 A1 | 10/2013 | Dryzun | |
| 2013/0277021 A1 | 10/2013 | Huebel | |
| 2014/0014493 A1 | 1/2014 | Ryan | |
| 2014/0251585 A1 | 9/2014 | Kusuda et al. | |
| 2015/0010874 A1 | 1/2015 | Ghazvini et al. | |
| 2015/0014323 A1 | 1/2015 | Loukus et al. | |
| 2016/0116218 A1 | 4/2016 | Shedd et al. | |
| 2016/0116222 A1 | 4/2016 | Shedd et al. | |
| 2017/0030519 A1 | 2/2017 | Kuczek et al. | |
| 2017/0248372 A1 | 8/2017 | Emo et al. | |

FOREIGN PATENT DOCUMENTS

| | | | | |
|---|---|---|---|---|
| EP | 1837616 A2 | 9/2007 | | |
| GB | 2310896 A | 9/1997 | | |
| WO | 0192788 A1 | 12/2001 | | |
| WO | 2011115883 A2 | 9/2011 | | |
| WO | 2014105113 A1 | 7/2014 | | |
| WO | WO-2015160324 A1 * | 10/2015 | ............... | F17C 1/08 |

OTHER PUBLICATIONS

Partial European Search Report and Opinion issued in connection with corresponding EP Application No. H162283.0 dated Oct. 26, 2017.
Dejong (Flow, Heat Transfer, and Pressure Drop Interactions in Louvered-Fin Arrays) (Year: 1999).
Jungwon Ahn (Fundamental Studies of Crossflow Heat Exchangers for Laminar and Turbulent Flows) (Year: 2017).
Kim et al., "Two-phase flow distribution of air-water annular flow in a parallel flow heat exchanger", International Journal of Multiphase Flow, vol. 32, Issue: 12, pp. 1340-1353, Dec. 2006.
International Search Report and Written Opinion, dated Jan. 22, 2016, for International Application No. PCT/US2015/054115.
Silva et al., "Constructal multi-scale tree-shaped heat exchangers", Journal of Applied Physics, vol. 96, Issue: 3, 2004.
European office action for application 17162283.0 mail date Jan. 5, 2022 (5 pages).

* cited by examiner

HEAT EXCHANGER INCLUDING FURCATING UNIT CELLS

CROSS REFERENCE TO RELATED APPLICATIONS

This application is a Divisional of U.S. patent Ser. No. 16/988,314, filed 7 Aug. 2020, which is a continuation-in-part of U.S. application Ser. No. 15/077,191, filed 22 Mar. 2016, now U.S. Pat. No. 10,739,077, which is a continuation-in-part of International Patent Application No. PCT/US2015/054115, filed 6 Oct. 2015, which claims priority of U.S. Provisional Patent Application No. 62/060,719, filed 7 Oct. 2014. The entire disclosures of all these applications are incorporated herein by reference.

BACKGROUND

The subject matter described herein relates to heat exchangers and, more specifically, heat exchangers including unit cells forming furcating flow passageways.

At least some known heat exchangers utilize heat transfer fluids that flow through the heat exchangers and transfer heat. A heat transfer efficiency of the heat exchangers is determined, at least in part, by the flow of the heat transfer fluids through the heat exchangers. As the heat transfer fluids flow through the heat exchangers, the heat transfer fluids tend to establish a boundary layer which increases thermal resistance and reduces the heat transfer efficiency of the heat exchangers. In addition, the heat transfer efficiency of the heat exchangers is affected by characteristics of the heat exchanger such as material properties, surface areas, flow configurations, pressure drops, and resistivity to thermal exchange. Improving any of these characteristics allows the heat exchanger to have an increased heat transfer efficiency.

Additionally, some systems or applications require heat exchangers to fit within a specified system volume and weigh less than a specified weight. Reducing the size of the heat exchangers to meet system requirements, however, can affect characteristics that determine heat transfer efficiency. Also, at least some heat exchangers are not properly shaped to fit within the systems, which results in ineffective use of space and/or wasted volume. Moreover, at least some known heat exchangers are formed to meet system requirements using fabrication techniques that require multiple joints, such as brazed and welded joints. Such joints may deteriorate over time, thereby decreasing a service life of the heat exchangers.

BRIEF DESCRIPTION

In one or more embodiments, a heat exchanger is provided that can include furcating unit cells coupled with each other. Each of the unit cells can include a sidewall that defines several openings into an interior of the unit cell. At least a first opening of the openings can be configured to be an inlet to receive a first fluid into the unit cell and at least a second opening of the openings can be configured to be an outlet through which the first fluid exits the unit cell. The sidewall can define interior passageways through the interior of the unit cell that direct the first fluid into the unit cell. The sidewall can also divide flow of the first fluid into separate orthogonal flows through the interior passageways and out of the unit cell. The unit cells can be coupled with each other with the sidewalls of the unit cells separating exterior volumes outside of the unit cells from the interior passageways of the unit cells. The unit cells may also be coupled with each other with the sidewalls fluidly coupling the interior passageways of the unit cells with each other. Further, the sidewalls can separate the exterior volumes outside of the unit cells from the interior passageways of the unit cells such that a second fluid can flow through the exterior volumes and exchange heat with the first fluid flowing through the interiors of the unit cells without the first fluid and the second fluid mixing with each other.

In another aspect, a heat exchanger is provided that can include furcating unit cells coupled with each other. Each of the unit cells can be elongated along an axis and include a sidewall that defines annular ring openings on opposite ends of the unit cell along the axis. The sidewall also can define undulating annular rings between the annular ring openings and axially separated from each other along the axis. The sidewall can further define angled openings into the unit cell both above and below each of the undulating annular rings. At least a first opening of the annular ring openings and the angled openings can be configured to be an inlet to receive a first fluid into the unit cell and at least a second opening of the annular ring openings and the angled openings configured to be an outlet through which the first fluid exits the unit cell. The sidewall can also define interior passageways through an interior of the unit cell that direct the first fluid into the unit cell and divide flow of the first fluid into separate flows through the interior passageways and out of the unit cell.

In one or more embodiments, a heat exchanger is provided that can include furcating unit cells coupled with each other. Each of the unit cells can include a sidewall that defines several openings into an interior of the unit cell. At least a first opening of the openings can be configured to be an inlet to receive a first fluid into the unit cell and at least a second opening of the openings configured to be an outlet through which the first fluid exits the unit cell. The sidewall can define interior passageways through the interior of the unit cell that direct the first fluid into the unit cell and divide flow of the first fluid into separate flows through the interior passageways and out of the unit cell. The sidewall of each of the unit cells can be shaped to divide a first flow of the first fluid inside the unit cell into at least a second, third, and fourth flow of the first fluid within the unit cell and out of the unit cell.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects, and advantages of the present disclosure will become better understood when the following detailed description is read with reference to the accompanying drawings in which like characters represent like parts throughout the drawings, wherein.

Figure 1:
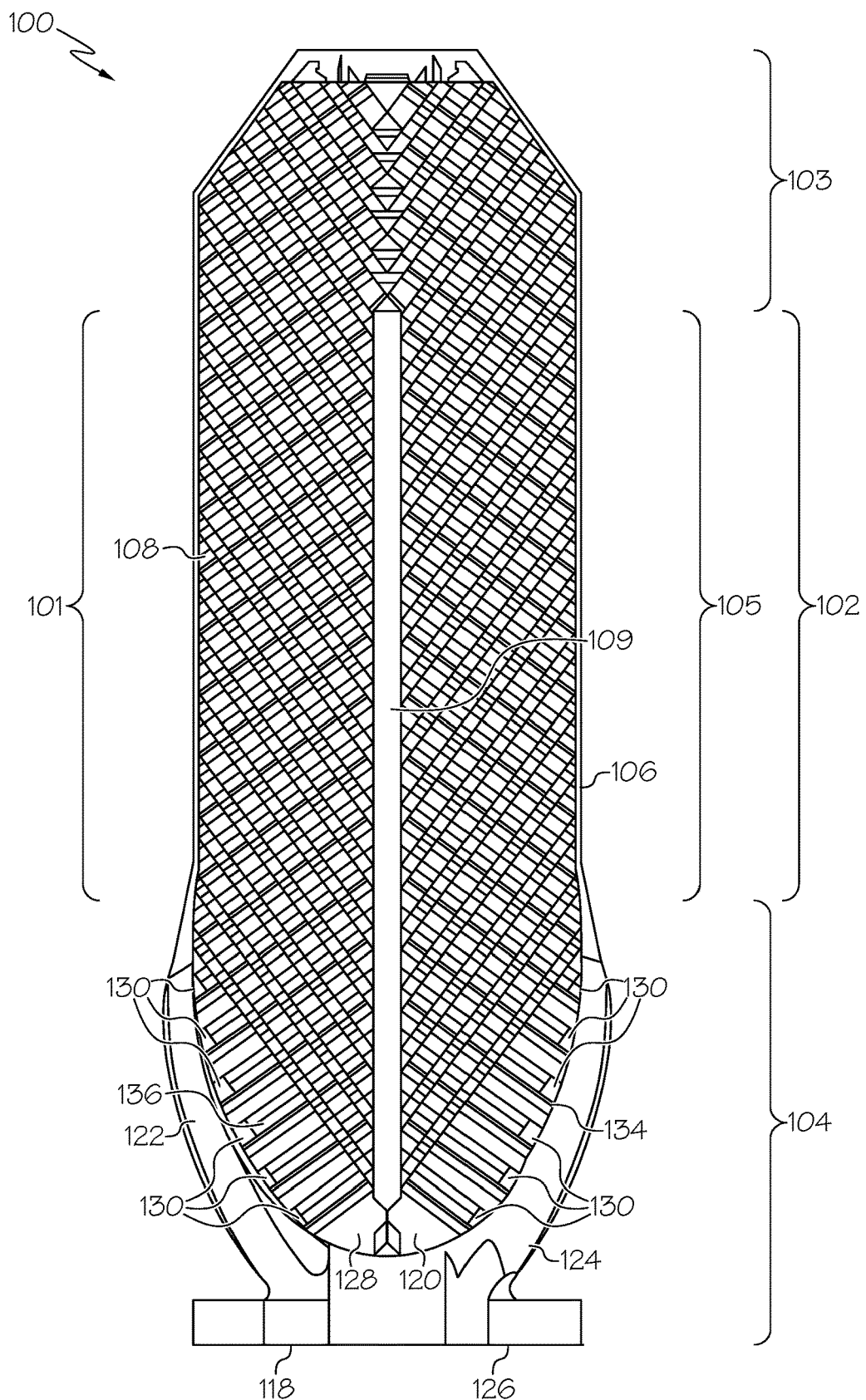
FIG. 1 is a schematic sectional view of an example heat exchanger.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to several terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations that extend substantially parallel to a centerline of the heat exchanger. Moreover, the terms "radial" and "radially" refer to directions and orientations that extend substantially perpendicular to the centerline of the heat exchanger. In addition, as used herein, the terms "circumferential" and "circumferentially" refer to directions and orientations that extend arcuately about the centerline of the heat exchanger. It should also be appreciated that the term "fluid" as used herein includes any medium or material that flows, including, but not limited to, air, gas, liquid, and steam.

In one embodiment, a multifaceted surface includes a set of two or more planar surfaces that, when combined, approximately form a smooth, curved surface. For example, two or more planar surfaces may be arranged side-by-side at obtuse angles with respect to each other to approximate or follow the path of a smooth, curved surface. As the number of planar surfaces approximating a smooth surface increases, the surfaces more closely follow a perfectly smooth surface. For example, a multifaceted surface formed from sixty-four planar surfaces disposed side-by-side in a series may more closely follow a perfectly smooth, curved surface than another multifaceted surface formed from fewer (e.g., four) planar surfaces disposed side-by-side in that the maximum distance between any of the sixty-four surfaces and the curved surface may be shorter than the maximum distance between any of the four surfaces and the curved surface when the sixty-four surfaces and the four surfaces are overlaid on the curved surface.

In one embodiment, a continuous, even surface includes a surface that is smooth and is free from breaks, projections, undulations, recesses, or other unevenness. A smooth surface may be a flat surface or may be a curved surface. For example, the first and second passageways formed by a plurality of connected unit cells can have cross sectional shapes with smooth surfaces with curved sides or flat sides. The smooth surfaces can be free from breaks, projections, unevenness, and the like.

The systems and methods described herein include a core that enables heat exchangers to have different shapes, sizes, and flow configurations. The core includes several unit cells. The unit cells define passageways for at least two different heat exchange fluids such that the fluids combine and divide in close proximity separated only by a sidewall of the unit cell. For example, the unit cells can be coupled with each other (or formed to be coupled with each other) such that the interior volumes of the unit cells form interior passageways inside the unit cells, while the volumes outside of the unit cells (e.g., volumes located between the unit cells) can form exterior passageways outside of and between the unit cells. The interior passageways are separated from the exterior passageways by the walls that define the shapes of the unit cells. One heat exchanging fluid flows through the interior passageways while another heat exchanging fluid flows through the exterior passageways. These fluids can exchange heat between each other through the walls of the unit cells without the fluids ever mixing with each other. One fluid can transfer heat to another fluid to cool the fluid transferring the heat.

In some embodiments, each unit cell is configured to receive flows of heat exchange fluid from one or more (up to five) other unit cells such that the flows combine into a single flow within the unit cell. In addition, the walls of each unit cell forms a furcated interior passageway such that flow of the fluid within the unit cell divides and can be discharged from the unit cell into one or more (up to five) other unit cells. Alternatively, each unit cell may receive flow of a fluid from a different number of other unit cells and/or direct flow of the fluid out to a different number of other unit cells. The thermal boundary layers of the heat exchange fluids are reduced, and the heat exchange fluids more efficiently transfer heat through the sidewalls of the unit cells in comparison to heat exchange fluids in known heat exchangers. Moreover, the heat exchangers described herein include multiple arrangements and flow configurations to meet overall system requirements and have increased efficiency.

Figure 2:
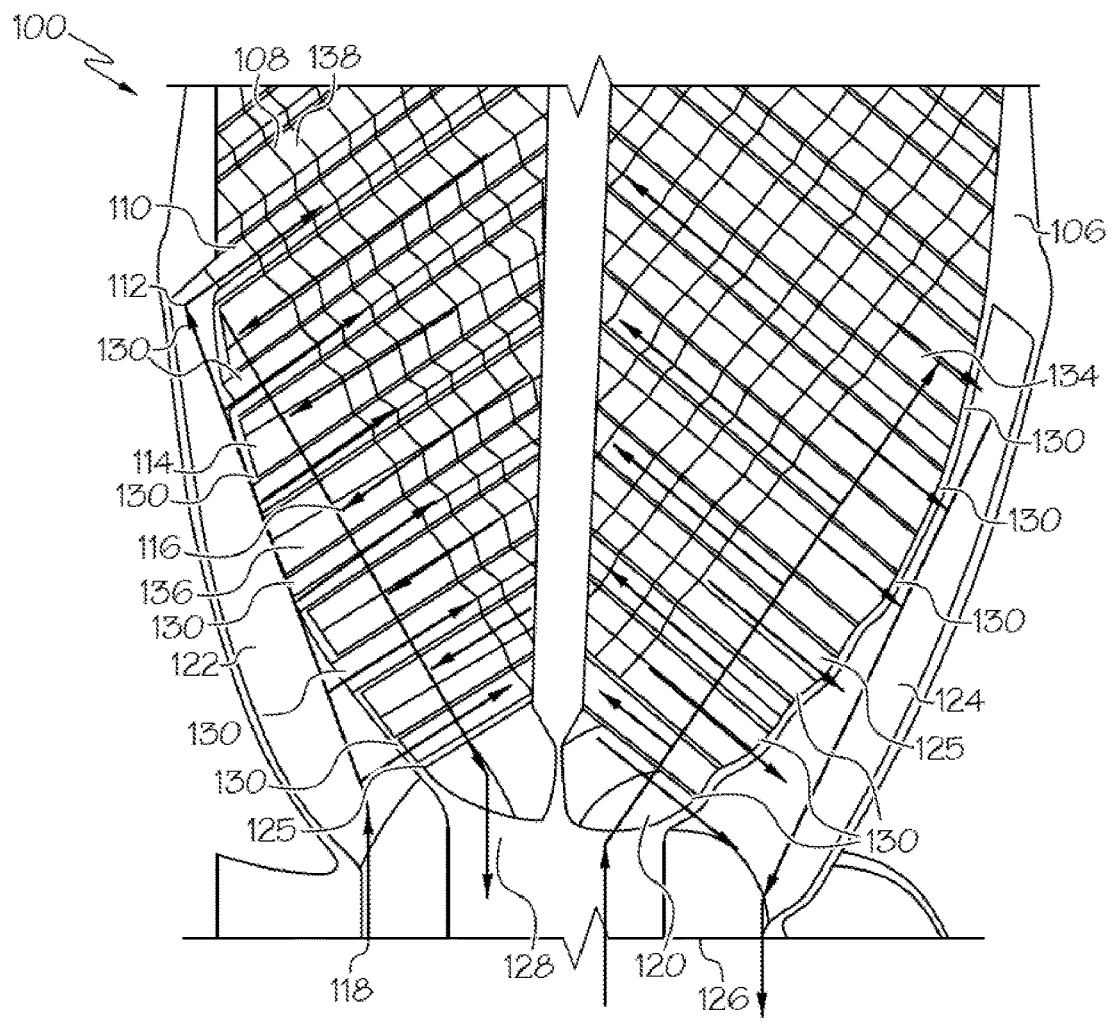
FIG. 2 is a schematic view of a portion of the heat exchanger shown in FIG. 1.

FIG. 1 is a sectional view of an example heat exchanger 100. FIG. 2 is a partially schematic view of a portion of heat exchanger 100. Heat exchanger 100 includes a core 102, a redirection portion 103, a manifold portion 104, and a casing 106. Each of manifold portion 104, core 102, and redirection portion 103 includes a plurality of unit cells 108 defining a first passageway 110 for a first fluid 112 to flow through and a second passageway 114 for a second fluid 116 to flow through. The first passageways 110 can be interior passageways within the unit cells described herein and the second passageways 114 can be exterior passageways located between the unit cells described herein. Alternatively, the first passageways 110 can be the exterior passageways between the unit cells and the second passageways 114 can be the interior passageways located inside the unit cells. The core 102 can include a first core portion 101 and a second core portion 105. The core portions 101, 105 are disposed on opposite sides of the inner wall 109.

The first fluid 112 and the second fluid 116 are received into the heat exchanger by the manifold portion 104. For example, sources of the fluids 112, 116 can be fluidly coupled with the manifold portion 104, such as tanks, outlets of other devices, etc. The fluids 112, 116 are directed through the unit cells on opposite sides of the sidewalls of the unit cells through the manifold portion 104. The fluids 112, 116 transfer heat (e.g., from the first fluid 112 to the second fluid 116 or from the second fluid 116 to the first fluid 112) through or across the sidewalls of the unit cells while the sidewalls prevent the fluids 112, 116 from mixing with each other. The fluids 112, 116 flow through and between the unit cells in the manifold portion 104 to the first core portion 101, and continue to flow through and between the unit cells in the first core portion 101 toward the redirection portion 103 (while continuing to exchange heat between the fluids 112, 116).

In the redirection portion 103, first fluid 112 and second fluid 116 are redirected by unit cells 108. Specifically, first fluid 112 and second fluid 116 are turned approximately 180° in the redirection portion 103 toward the second core portion 105. The fluids 112, 116 flow through and between the unit cells in the second core portion 105, and continue to flow through and between the unit cells in the first core portion 101 back toward the manifold portion 104 (while continuing to exchange heat between the fluids 112, 116). The fluid 112 and/or the fluid 116 may then exit the heat exchanger out of the manifold portion 104. In alternative embodiments, heat exchanger 100 has any configuration that enables heat exchanger 100 to operate as described herein. For example, in some embodiments, at least a portion of first fluid 112 and/or second fluid 116 is replaced with an at least partially solid substance configured to accommodate thermal shocks, such as wax, fusible alloy and/or molten salt.

In the example embodiment, manifold portion 104 includes a first inlet 118, a second inlet 120, an inlet header 122, an outlet header 124, a first outlet 126, and a second outlet 128. In alternative embodiments, manifold portion 104 has any configuration that enables heat exchanger 100 to operate as described herein. For example, in some embodiments, manifold portion 104 includes a plurality of first inlets 118, second inlets 120, inlet headers 122, outlet headers 124, first outlets 126, and/or second outlets 128. In further embodiments, heat exchanger 100 includes a plurality of manifold portions 104 coupled to core 102.

In the example embodiment, each of inlet header 122 and outlet header 124 include a plurality of ports 130 in fluid communication with first passageway 110. Inlet header 122 and outlet header 124 change in cross-sectional area along the direction of flow of first fluid 112 to accommodate the differing volume of first fluid 112 in inlet header 122 and outlet header 124 due to first fluid 112 flowing through ports 130. Specifically, inlet header 122 tapers in cross-sectional area from a maximum cross-sectional area adjacent first inlet 118 to a minimum cross-sectional area adjacent a distal end of inlet header 122. Outlet header 124 increases in cross-sectional area from a minimum cross-sectional area adjacent a distal end of outlet header 124 to a maximum cross-sectional area adjacent first outlet 126. Ports 130 are substantially bell-shaped to facilitate smooth fluid flow through ports 130 and to minimize irreversible flow losses. In alternative embodiments, heat exchanger 100 includes any inlet header 122 and outlet header 124 that enables heat exchanger 100 to operate as described herein. For example, in some embodiments, heat exchanger 100 includes a plurality of inlet headers 122 and outlet headers 124. In further embodiments, at least one inlet header 122 and/or outlet header 124 is coupled to second passageway 114.

In the example embodiment, core 102 further includes an inlet plenum 134 and an outlet plenum 136. Inlet plenum 134 and outlet plenum 136 are in fluid communication with second passageway 114. Inlet plenum 134 is coupled to second inlet 120 and outlet plenum 136 is coupled to second outlet 128. Inlet plenum 134 and outlet plenum 136 are adjacent inlet header 122 and outlet header 124 to facilitate first fluid 112 and second fluid 116 exchanging heat as first fluid 112 and second fluid 116 flow into and out of core 102. Moreover, a plurality of conduits 125 are coupled to inlet header 122 and outlet header 124 and extend through inlet plenum 134 and outlet plenum 136. In alternative embodiments, heat exchanger 100 includes any inlet plenums 134 and outlet plenums 136 that enable heat exchanger 100 to operate as described herein.

Also, in the example embodiment, core 102 is manufactured using an additive manufacturing process. An additive manufacturing process allows core 102 to have complex geometries while limiting the number of joints of core 102. In alternative embodiments, core 102 is formed in any manner that enables heat exchanger 100 to operate as described herein.

During operation of heat exchanger 100, first fluid 112 flows into inlet header 122 through first inlet 118 and is distributed into first passageway 110 through ports 130. First fluid 112 in first passageway 110 is directed through core 102, redirection portion 103, and manifold portion 104. After flowing through first passageway 110, first fluid 112 flows through ports 130 into outlet header 124 and is discharged from heat exchanger 100 through first outlet 126. Second fluid 116 flows into inlet plenum 134 through second inlet 120 and is distributed into second passageway 114. Second fluid 116 in second passageway 114 is directed through core 102, redirection portion 103, and manifold portion 104. After flowing through second passageway 114, second fluid 116 flows into outlet plenum 136 where second fluid 116 is discharged from heat exchanger 100 through second outlet 128.

In alternative embodiments, heat exchanger 100 includes any passageways that enable heat exchanger 100 to operate as described herein. For example, in some embodiments, heat exchanger 100 includes at least one bypass passageway to enable first fluid 112 and/or second fluid 116 to bypass at least a portion of first passageway 110 and/or second passageway 114. The bypass passageway extends through any portions of heat exchanger 100, e.g., through core 102, redirection portion 103, manifold portion 104, and/or along an external periphery of heat exchanger 100. As a result, the bypass passageway facilitates management of pressure drop due to excess amounts of first fluid 112 and/or second fluid 116.

Moreover, in the example embodiment, core 102 is configured such that first fluid 112 and second fluid 116 exchange heat as first fluid 112 and second fluid 116 flow through core 102, redirection portion 103, and manifold portion 104. For example, as shown in FIG. 2, first fluid 112 and second fluid 116 exchange heat through sidewalls of unit cells 108 as first fluid 112 and second fluid 116 flow through portions of first passageway 110 and second passageway 114 defined by unit cells 108. As will be described in more detail below, unit cells 108 define portions of first passageway 110 and second passageway 114 where first fluid 112 and second fluid 116 combine and divide to disrupt thermal boundary layers in first fluid 112 and second fluid 116. In the example embodiment, unit cells 108 are aligned and coupled together such that core 102 is substantially symmetrical, which facilitates multiple flow configurations of heat exchanger 100. For example, in the illustrated embodiment, core 102 has a diamond shape. In alternative embodiments, core 102 has any configuration that enables heat exchanger 100 to operate as described herein.

In some embodiments, core 102 is divided up into independent zones. Unit cells 108 facilitate sectioning and/or segmenting core 102 into the independent zones. In further embodiments, heat exchanger 100 includes a plurality of discrete cores 102. The repeating geometric shapes of unit cells 108 facilitate core 102 coupling to other cores 102 in multiple different configurations. In some embodiments, heat exchanger 100 includes a segment (not shown) linking separate cores 102 such that a portion of fluid flows through the segment between cores 102.

In one embodiment, a first fluid 112 flows into an inlet header 122 through a first inlet 118 and is distributed into a first passageway 110 through ports 130 through the heat exchanger 100 into an outlet header 124. The first fluid 112 is discharged from the heat exchanger 100 through a first outlet 126. A second fluid 116 flows into an inlet plenum 134 through a second inlet 120 and is distributed into a second passageway 114. The second fluid 116 in the second passageway 114 is directed through the heat exchanger 100 into an outlet plenum 136 where the second fluid 116 is discharged from the heat exchanger 100 through a second outlet 128. The first fluid 112 may flow through the first passageway 110 in a direction that is toward and transversely angled (e.g., acutely angled) toward the casing 106 and that is away from and transversely angled away from an inner wall 109. The second fluid 116 may flow through the second passageway 114 in a direction that is also transverse to the casing 106. The unit cells 108 are configured to be shaped to allow the first fluid 112 to flow through the first passageway 110 and the second fluid 116 to flow through the second passageway 114. The first fluid 112 and the second fluid 116 flow through the respective first and second passageways 110, 114 from an end in the manifold portion 104. The first fluid 112 and the second fluid 116 may continue to flow through the respective first and second passageways 110, 114 through the core 102 in a direction that is toward and transversely angled (e.g., acutely angled) toward the casing 106 and that is away from and transversely angled away from the inner wall 109 within the heat exchanger 100.

The redirection portion 103 operates as a turning region for the first fluid 112 and the second fluid 116. The first fluid 112 and the second fluid 116 change direction to pass through the turning region or redirection portion 103. In the redirection portion 103, the unit cells 108 are configured to conform to the shape of the redirection portion 103 of the heat exchanger 100 and change the direction in which the first fluid 112 and the second fluid 116 flow through the respective first and second passageways 110, 114. The inner wall 109 shown in the core 102 and the manifold portion 104 does not appear in the redirection portion 103. The first fluid 112 and the second fluid 116 continue to flow from the redirection portion 103 through respective first and second passageways 110, 114 into and through the core 102 in a direction that is away from and transversely angled (e.g., acutely angled) away from the casing 106 and that is toward and transversely angled toward the inner wall 109 into the manifold portion 104. Pressure differential causes the first and second fluids to flow in and out of the openings of the unit cells 108 and through the series of unit cells 108 around the inner wall 109 within the heat exchanger 100. Having the first and second fluids 112, 116 enter the redirection portion 103 of the heat exchanger 100 allows for more heat transfer between the first and second fluids 112, 116. The increased heat transfer can occur because the fluids continue to flow in the unit cells 108 as the fluids flow along both sides of the inner wall 109 and around the end of the inner wall 109 instead of having completely separated sections of the heat exchanger 100.

Figure 3:
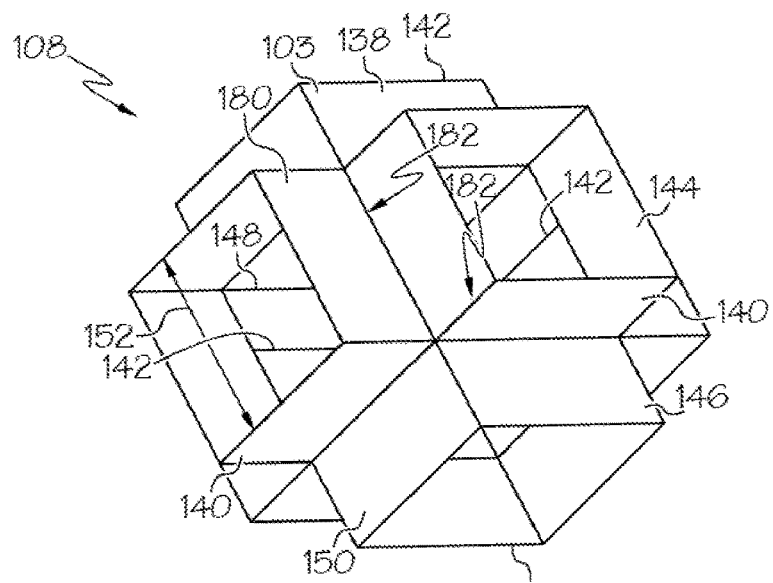
FIG. 3 is a schematic isometric view of a unit cell of the heat exchanger shown in FIG. 1.

FIG. 3 is a schematic isometric view of a unit cell 108. The unit cell 108 includes a sidewall 138 defining a plurality of openings 140, 142, an interior surface 144, and an exterior surface 146. In the illustrated embodiment, the openings 140, 142 of each unit cell 108 can define or provide one or more unit cell inlets 140 and one or more unit cell outlets 142 for the flow of fluid through the unit cell 108. There is a total of six inlets and outlets in the illustrated unit cell, but optionally a larger or smaller total number of inlets and outlets can be provided.

The sidewalls 138 of several unit cells define the interior and exterior passageways of the combined unit cells 108. For example, the volumes on one side of the sidewall 138 of a unit cell 108 can be the interior passageways of the unit cell 108 and the volumes on the opposite side of the sidewall 138 of the unit cell 108 can be the exterior passageways of the unit cell 108. The unit cells 108 can be coupled such that the interior passageways of the unit cells 108 are fluidly coupled with each other and the exterior passageways of the unit cells 108 are fluidly coupled with each other, but the sidewalls 138 prevent the interior passageways from being fluidly coupled with the exterior passageways.

The unit cell can receive fluid into the unit cell from one or more of the inlets and discharge the fluid out of the unit cell through one or more of the outlets. The unit cell 108 has unit cell inlets 140 and unit cell outlets 142 that enable heat exchanger 100 to operate as described herein. Also, unit cell 108 forms a first passageway portion 148 of the first passageway 110 and a second passageway portion 150 of the second passageway 114. The first passageway portion 148 and the second passageway portion 150 are configured for a first fluid 112 and a second fluid 116 to exchange thermal energy through the sidewall 138. The first passageway portion 148 has a first hydraulic diameter 152 with a size based on flow requirements, such as flow rate, pressure drop, and heat transfer, and/or volume requirements for the heat exchanger 100. As shown, the passageway portions are oriented along orthogonal directions such that flow of the first fluid within the unit cell is divided up into two or more orthogonal directions out of the unit cell.

The sidewalls 138 of the unit cells 108 are shown as formed from two-dimensional planar wall sections 180. These wall sections 180 intersect each other along linear interface paths 182. In the illustrated embodiment, the wall sections 180 that intersect each other are orthogonally oriented with respect to each other. Alternatively, the intersecting wall sections 180 may be oriented at other angles.

Figure 4:
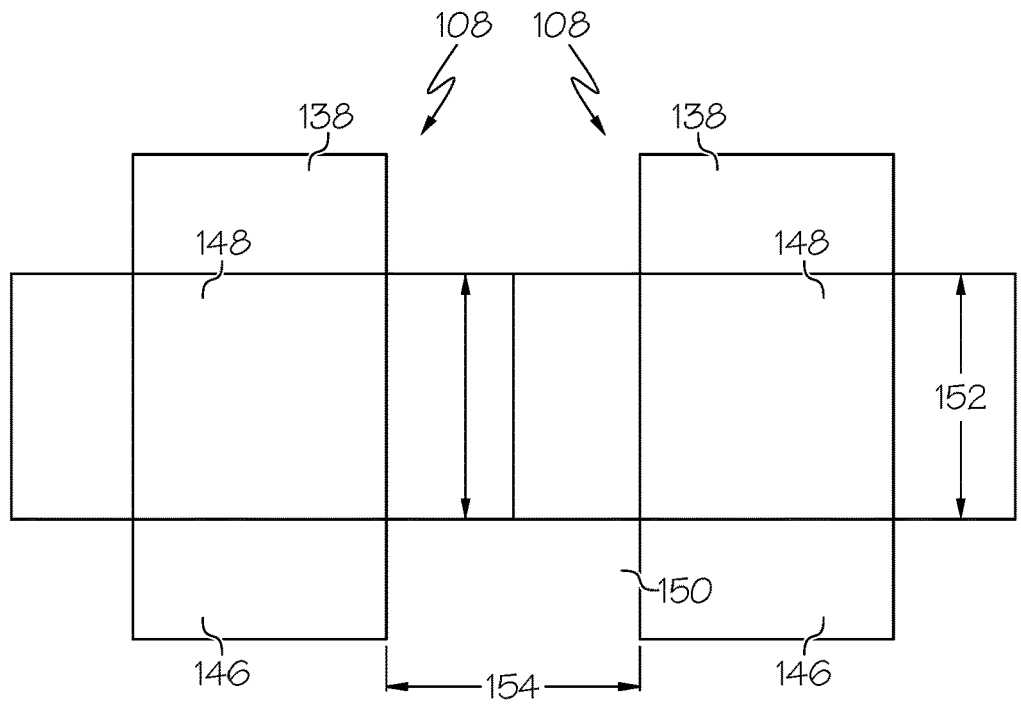
FIG. 4 is a schematic side view of a plurality of the unit cells shown in FIG. 3.

FIG. 4 is a schematic side view of a plurality of unit cells 108. In some embodiments, core 102 includes some unit cells 108 that differ in some aspects from unit cells 108 shown in FIGS. 3 and 4. In the example embodiment, each unit cell 108 as shown in FIG. 3 includes a sidewall 138 defining a plurality of unit cell inlets 140, a plurality of unit cell outlets 142, an interior surface 144, and an exterior surface 146. First fluid 112 flows into unit cell 108 through unit cell inlets 140, contacts interior surface 144, and flows out of unit cell 108 through unit cell outlets 142. Second fluid 116 flows past unit cell 108 such that second fluid 116 contacts exterior surface 146. In the illustrated embodiment, each unit cell 108 has three unit cell inlet 140 and three unit cell outlets 142. In alternative embodiments, unit cell 108 has any unit cell inlets 140 and unit cell outlets 142 that enable heat exchanger 100 to operate as described herein.

Also, in the example embodiment, each unit cell 108 forms a first passageway portion 148 of first passageway 110 and a second passageway portion 150 of second passageway 114. First passageway portion 148 and second passageway portion 150 are configured for first fluid 112 and second fluid 116 to exchange thermal energy through sidewall 138. In operation, first fluid 112 flows into first passageway portion 148 from other first passageway portions 148 associated with other unit cells 108. First passageway portion 148 furcates such that first fluid 112 flows out of first passageway portion 148 towards further first passageway portions 148. First passageway portion 148 trifurcates such that first fluid 112 flows into three flow paths towards three different first passageway portions 148. Second fluid 116 flows into second passageway portion 150 from other second passageway portions 150. Second passageway portion 150 furcates such that second fluid 116 flows out of second passageway portion 150 towards further second passageway portions 150. First passageway portion 148 trifurcates such that second fluid 116 flows into three flow paths towards three different second passageway portions 150. First passageway portion 148 and second passageway portion 150 furcate at an approximately 90° angle. In alternative embodiments, first passageway portion 148 and second passageway portion 150 furcate at any angles that enable heat exchanger 100 to operate as described herein.

The furcated shapes of first passageway portion 148 and second passageway portion 150 provide for additional surface area to facilitate heat exchange between first fluid 112 and second fluid 116. Moreover, the furcation of unit cells 108 reduces and/or inhibits the formation of thermal boundary layers in first fluid 112 and second fluid 116. For example, thermal and momentum boundary layers are broken up each time first fluid 112 and second fluid 116 are redirected due to unit cells 108 furcating. Moreover, the repeated furcation in unit cells 108 inhibit first fluid 112 and second fluid 116 from establishing significant thermal and momentum boundary layers. In alternative embodiments, first passageway portion 148 and second passageway portion 150 have any configuration that enables heat exchanger 100 to operate as described herein.

Additionally, in the example embodiment, first passageway portion 148 has a first hydraulic diameter 152 and second passageway portion 150 has a second hydraulic diameter 154. First hydraulic diameter 152 and second hydraulic diameter 154 are determined based on flow requirements, such as flow rate, pressure drop, and heat transfer, and/or volume requirements for heat exchanger 100. Unit cell 108 forms first passageway portion 148 such that first hydraulic diameter 152 is approximately equal to the width of unit cell inlet 140. Second passageway portion 150 is formed by multiple unit cells 108. Accordingly, unit cell 108 spans only a portion of second hydraulic diameter 154. In the illustrated embodiment, unit cell 108 spans approximately half of second hydraulic diameter 154. Moreover, in the example embodiment, first hydraulic diameter 152 is approximately equal to second hydraulic diameter 154. In alternative embodiments, first passageway portion 148 and second passageway portion 150 have any hydraulic diameters that enable heat exchanger 100 to operate as described herein. For example, in some embodiments, first hydraulic diameter 152 and second hydraulic diameter 154 are different from each other. In further embodiments, first hydraulic diameter 152 is greater than second hydraulic diameter 154 such that a ratio of first hydraulic diameter 152 to second hydraulic diameter 154 is at least 2:1.

Moreover, in the example embodiment, first passageway portion 148 and second passageway portion 150 have a square cross-sectional shape. In alternative embodiments, first passageway portion 148 and second passageway portion 150 have any cross-sectional shape that enables heat exchanger 100 to operate as described herein. For example, in some embodiments, first passageway portion 148 and/or second passageway portion 150 have any of the following cross-sectional shapes, without limitation: rectangular, diamond, circular, and triangular. Moreover, in some embodiments, first passageway portion 148 and/or second passageway portion 150 include any of the following, without limitation: a fin, a surface having engineered roughness, a surface roughened by manufacturing process, any other heat transfer enhancement, and combinations thereof.

In the example embodiment, the shape and size of unit cells 108 is determined based at least in part on any of the following, without limitation: surface area, pressure drop, compactness of core 102, and fluid flow. In the example embodiment, unit cells 108 have substantially the same shape. Unit cells 108 have a partially cuboid shape. In alternative embodiments, core 102 includes any unit cells 108 that enable heat exchanger 100 to operate as described herein. In some embodiments, core 102 includes unit cells 108 that differ in configuration from each other. In further embodiments, the shape of unit cells 108 at least partially conforms to a shape of core 102. For example, in some embodiments, unit cells 108 are at least partially curved to align with an annular shape of core 102.

In some embodiments, at least a portion of unit cells 108 are flexible to facilitate unit cells 108 shifting in response to characteristics of first fluid 112 and/or second fluid 116 such as pressure, flow rate, volume, and density. For example, in some embodiments, sidewalls 138 are flexible and adjust to attenuate fluid surge. In further embodiments, unit cells 108 are flexible such that first fluid 112 causes first passageway 110 to expand and at least partially propel second fluid 116 through second passageway 114. In the example embodiment, sidewalls 138 of unit cells 108 are substantially rigid. In alternative embodiments, unit cells 108 have any amount of flexibility that enables heat exchanger 100 to operate as described herein.

Figure 5:
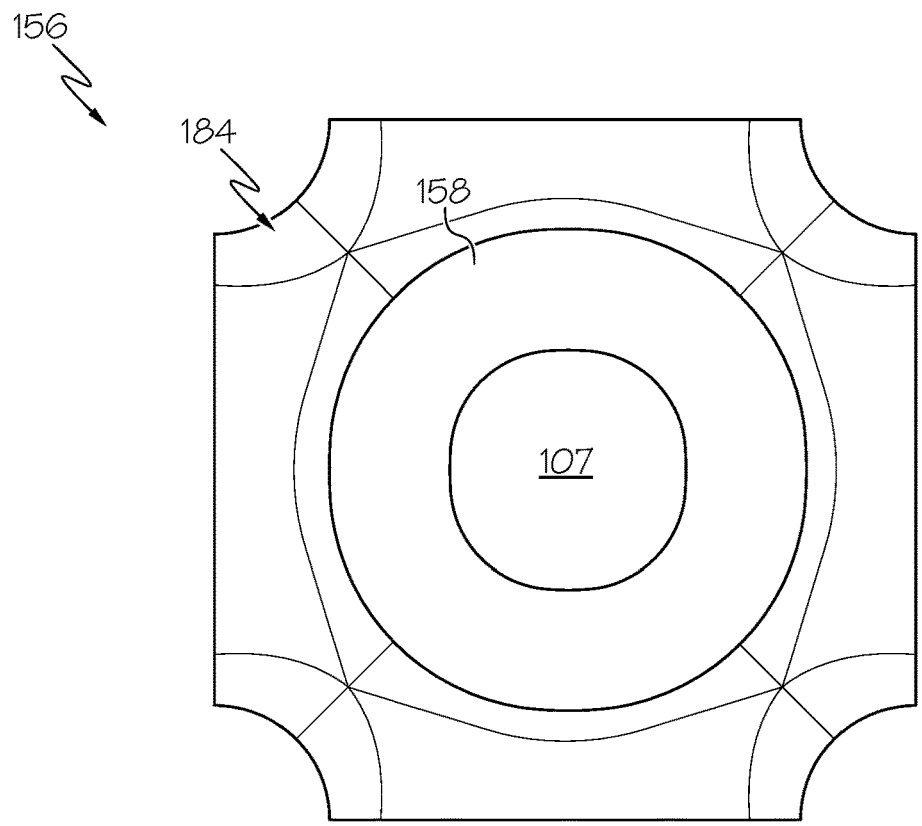
FIG. 5 is an elevational plan view of a unit cell for use in a heat exchanger.
Figure 6:
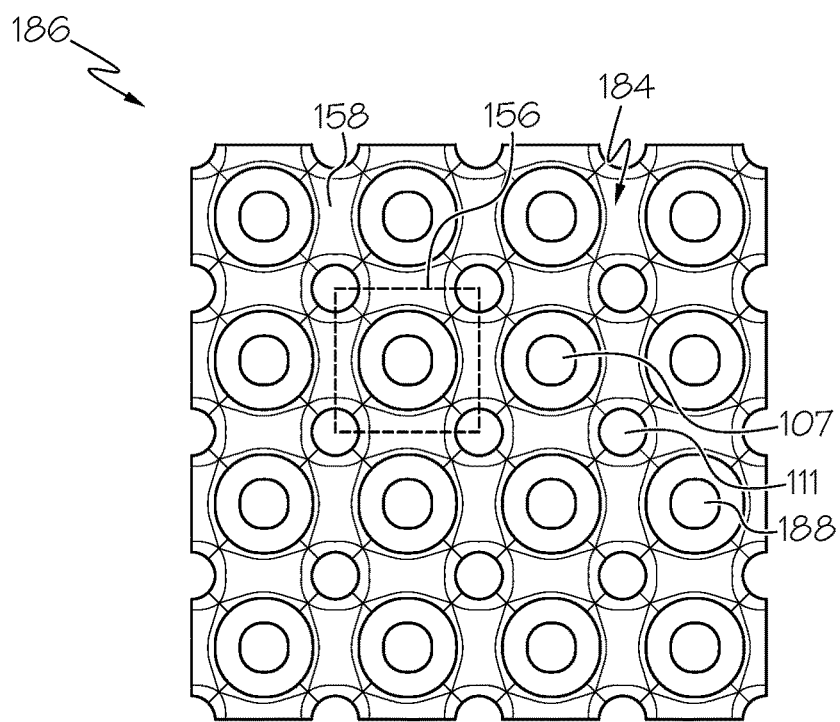
FIG. 6 is an elevational plan view of a heat exchanger assembly of several unit cells shown in FIG. 5 coupled with each other.
Figure 7:
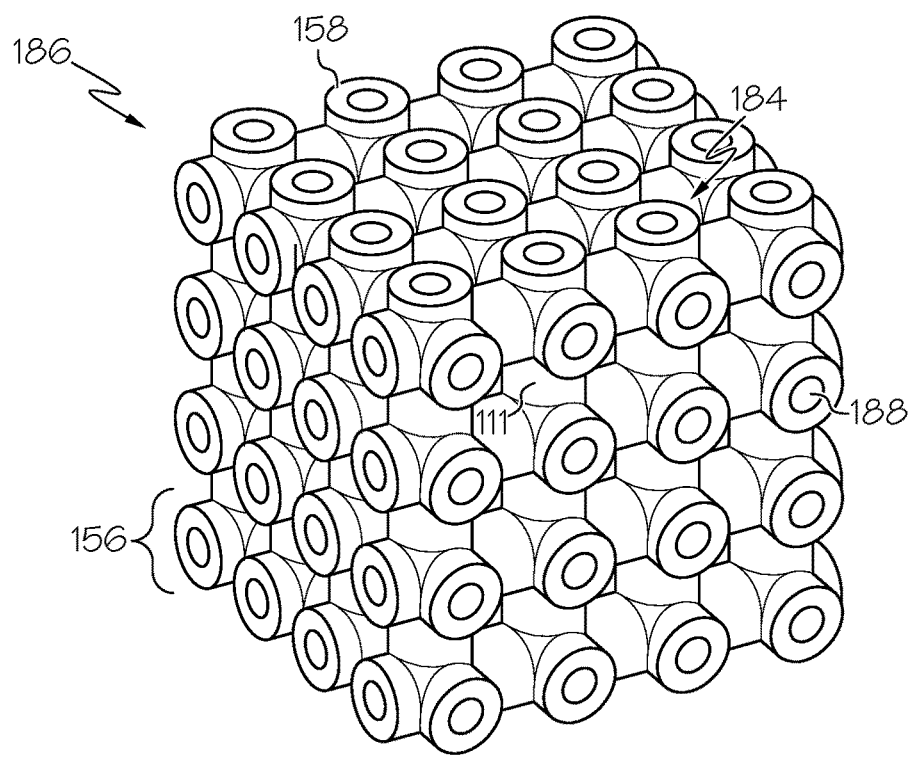
FIG. 7 is a perspective view of the heat exchanger assembly shown in FIG. 6.

FIG. 5 is an elevational plan view of a unit cell 156 for use in the heat exchanger 100. FIG. 6 is an elevational plan view of a heat exchanger assembly 186 of several unit cells 156 shown in FIG. 5 coupled with each other. FIG. 7 is a perspective view of the assembly 186 shown in FIG. 6. The unit cell 156 can be used in place of the unit cell 108 in the heat exchanger. The unit cell 156 differs from the unit cell 108 in at least that the unit cell 156 includes a sidewall 158 formed from curved surfaces 184, whereas the sidewall of the unit cell 108 is formed from planar surfaces. The curved surfaces 184 do not include interfaces between planar walls or bodies, and may be smooth surfaces devoid of protrusions, recesses, or the like. In one embodiment, the curved surfaces 184 may have a constant (or the same) radius of curvature. Alternatively, the curved surfaces 184 may have different radii of curvature. Optionally, the curved surfaces 184 may have different radii of curvature at different locations in the curved surfaces 184.

The curved surfaces 184 of the unit cell 156 are concave surfaces that form round or rounded openings 107. In the illustrated embodiment, the unit cell 156 includes six openings 107 into the interior volume of the unit cell 156, with three pairs of the openings 107 with the openings 107 in each pair facing in opposite directions. Alternatively, the unit cell 156 may include more or fewer openings 107. The openings 107 have circular shapes in the illustrated example, but optionally may form oval or other rounded shapes.

The curved surfaces 184 separate and define an interior volume of the unit cell 156 from an exterior volume outside of the unit cell 156. The openings 107 can define inlets and outlets of the unit cell 156, as described above. Several unit cells 156 can be coupled with each other (e.g., at the openings 107) so that the combined unit cells 156 form interior passageways 188 inside the unit cells 156 that are fluidly coupled with each other. As shown in FIGS. 6 and 7, the unit cells 156 can be combined into an array of a regular or repeating pattern of the unit cells 156. For example, the spacing, shape, connection, and orientation of the unit cells 156 can be repeated over and over throughout the heat exchanger.

The combined unit cells 156 also can form exterior passageways 111 outside of and between the unit cells 156. These exterior passageways also can be fluidly coupled with each other. The fluid flowing within the interior passageways between the unit cells 156 can exchange heat with the fluid flowing within the exterior passageways through the sidewalls 158 without the fluids mixing with each other, as described above.

Figure 8:
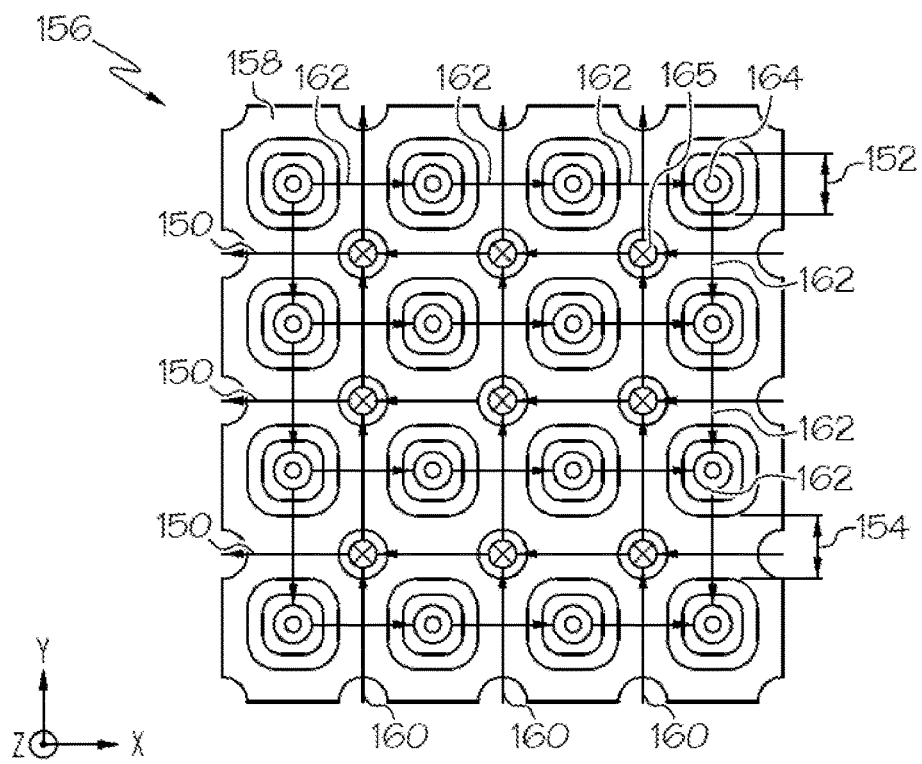
FIG. 8 is a view of fluid flow through a plurality of the unit cells shown in FIG. 5.

An example flow of first fluid 112 and second fluid 116 through a plurality of unit cells 108 is shown in FIG. 8. FIG. 8 includes an X-axis, a Y-axis, and a Z-axis for reference throughout the following description. Arrows 160 indicate the flow direction of first fluid 112 and arrows 162 indicate the flow direction of second fluid 116. Arrows 160 extend in a direction that is parallel to but opposite the X-axis, and arrows 162 extend along the Y-axis. Additionally, arrows 164 extend along the Z-axis pointing out of the drawing sheet toward the viewer and arrows 165 extend along the Z-axis pointing into the drawing sheet away from the viewer.

Unit cells 108 are coupled in flow communication such that each portion of the interior passageway receives first fluid 112 from one or more other interior passageway portions and each exterior passageway portion receives second fluid 116 from one or more other exterior passageway portions. Additionally, each interior passageway portion directs the first fluid toward one or more (up to five) different interior passageway portions within each unit cell and each exterior passageway portion directs the second fluid 116 toward one or more (up to five) exterior passageway portions 150. Optionally, each unit cell can receive the first fluid through three openings 107 (as inlets) and direct this received first fluid out of the same unit cell via the other three openings 107 (as outlets). Alternatively, the first fluid can be received into a unit cell by a different number of inlets and/or direct the first fluid out of the unit cell by a different number of outlets. Outside of the unit cells, the second fluid may flow around the unit cells and exchange heat with the first fluid inside the unit cells (through the sidewalls of the unit cells).

The unit cells and heat exchangers or heat exchange assemblies formed from the unit cells described herein may be additively manufactured. The unit cells having smoother surfaces and/or rounded transitions between surfaces of the sidewalls (e.g., the unit cell 156) may have improved heat exchange characteristics between the first and second fluids when compared to the unit cells having more planar surfaces and/or sharper transitions between surfaces of the sidewalls (e.g., the unit cell 108). This can be the result of less turbulence in the flow of the first and/or second fluid within and/or outside of the unit cells for the unit cells having smoother surfaces and/or rounded interfaces (when compared to the unit cells having more planar surfaces and/or sharper interfaces) that results in a lower fluid pressure drop. An additional benefit to the curved unit cells compared to the planar unit cells is the stress on the material—it can be 25% to 75% lower for the curved unit cell compared to the planar unit cell. This enables the curved unit cell structure to withstand higher pressures and higher thermal gradients. While the pressure drop and stress capability improve, the curved unit cells may result in a lower heat transfer coefficient. In many applications, the benefit of better pressure drop and stress capabilities outweigh the lower heat transfer coefficient. In additively manufacturing the unit cells, the unit cells having curved surfaces and/or rounded interfaces may require similar processing time and/or power for the additively manufacturing system to create the unit cells (when compared to the unit cells having more planar surfaces and/or sharper interfaces). For example, a three-dimensional printer that prints the unit cells 108, 156 may require approximately the same amount of time and/or computer processing power to manufacture the curved unit cells 156 relative to manufacturing the same number of the unit cells 108. However, during the manufacturing process there may be a key difference in processing time and/or power between the unit cells having curved surfaces and the unit cells having more planar surfaces. The difference may be in the digital process of creating the CAD drawings, manipulating the drawings, converting the CAD representations into a format that the printer can use, and the storing and manipulating of the digital formal of the representations that the printer uses. The definition of the manufacturing process may include the creation of a digital representation and all steps required after its creation to obtain a finished part. Therefore, a tradeoff may exist between the manufacturing costs (e.g., time and processing power) and the heat transfer in creating the unit cells.

In order to improve the heat transfer capability of the unit cells over the unit cell 108 while avoiding the extreme manufacturing costs of the unit cell 156, one or more embodiments of the inventive subject matter described herein can provide unit cells having multi-faceted surfaces. These surfaces are formed from several intersecting planar surfaces or portions of the sidewalls of the unit cells. The number of these intersecting planar surfaces can be varied to control how much the sidewalls of the unit cells are closer to the smooth, curved surfaces of the unit cell 156 or closer to the orthogonal surfaces of the unit cell 108. For example, unit cells having sidewalls formed from many multifaceted surfaces may have pressure drop and stress capability benefits, approaching those of fully curved unit cells, between the fluids flowing inside and outside of the unit cells but may require greater manufacturing costs to produce.

Conversely, unit cells having sidewalls formed from fewer multifaceted surfaces may have lesser pressure drop and stress capability benefits between the fluids flowing inside and outside of the unit cells but may require lesser manufacturing costs to produce.

Figure 9:
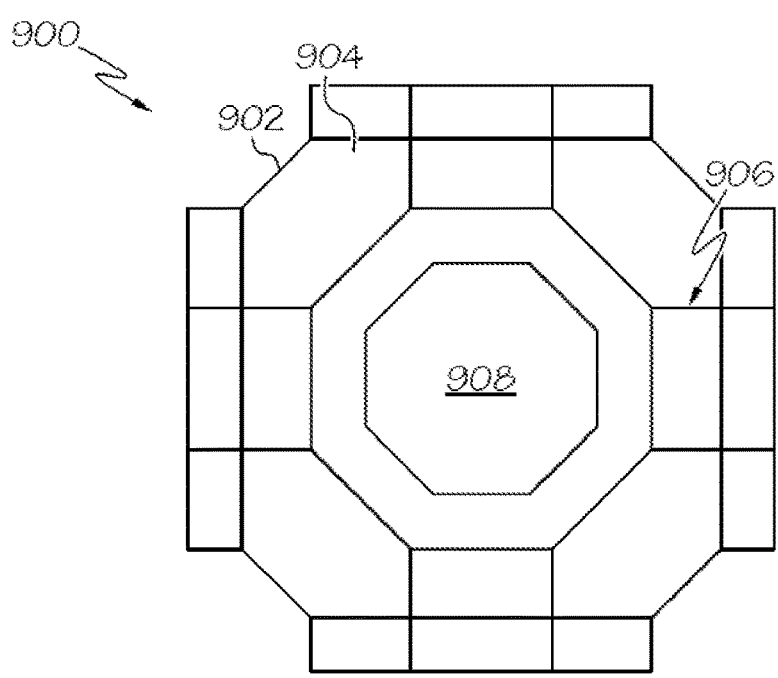
FIG. 9 illustrates an elevational side view of one example of a multi-faceted unit cell.
Figure 10:
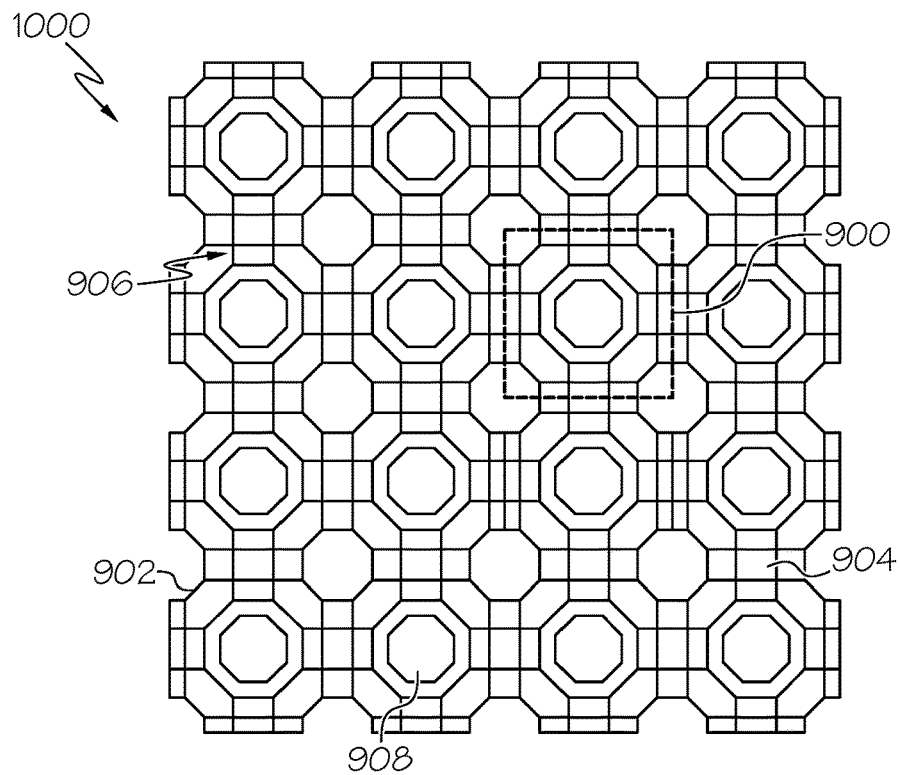
FIG. 10 illustrates an elevational side view of a multi-faceted heat exchanger assembly formed from several of the multi-faceted unit cells shown in FIG. 9.
Figure 11:
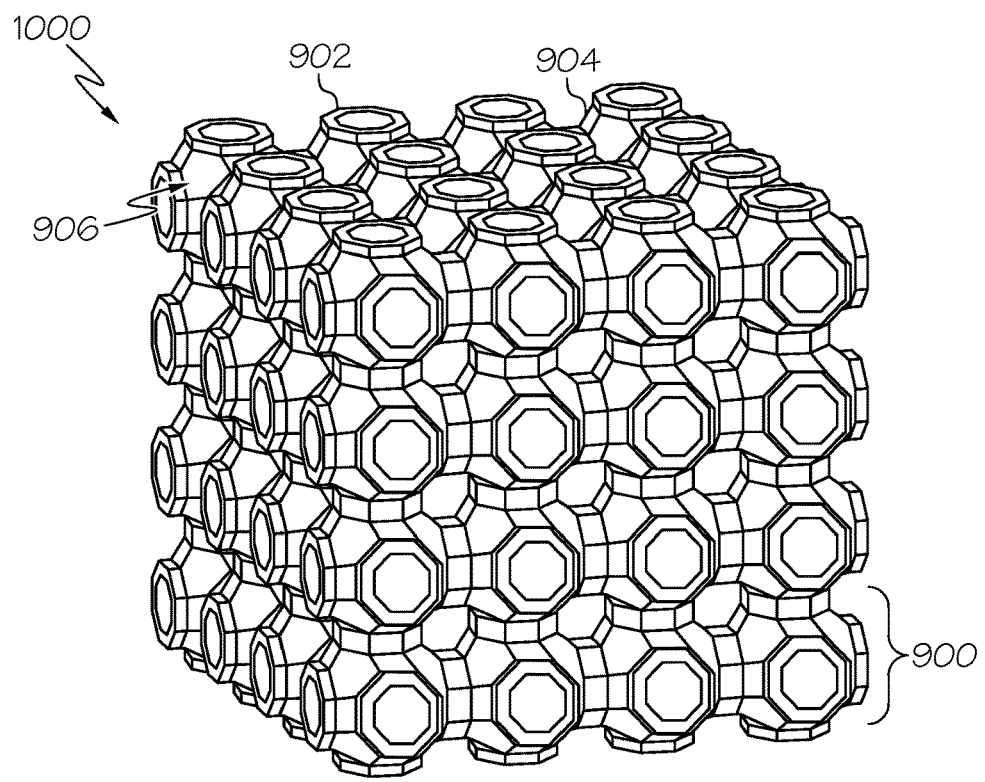
FIG. 11 illustrates a perspective view of the multi-faceted heat exchanger assembly shown in FIG. 10.

FIG. 9 illustrates an elevational side view of one example of a multi-faceted unit cell 900. FIG. 10 illustrates an elevational side view of a multi-faceted heat exchanger assembly 1000 formed from several of the multi-faceted unit cells 900 shown in FIG. 9. FIG. 11 illustrates a perspective view of the multi-faceted heat exchanger assembly 1000 shown in FIG. 10. The multi-faceted unit cell 900 includes a sidewall 902 that is formed of several intersecting planar surfaces 904. Optionally, one or more of the surfaces 904 may be a curved surface having a radius of curvature. In the illustrated example, the unit cell 900 includes ninety-six planar surfaces 904, but optionally may include more or fewer planar surfaces.

The surfaces 904 intersect each other along linear interface paths 906. Alternatively, one or more of the interface paths 906 may be curved. The surfaces 904 are oriented at non-orthogonal angles. For example, the surfaces 904 may be oriented at obtuse angles with respect to each other. The surfaces 904 define or frame openings 908 into the interior volume of the unit cell 900. In contrast to the circular openings of the unit cell 156, the openings 908 of the unit cell 900 are polygons (e.g., octagons, although the openings 908 may have another polygon shape). Several of the surfaces 904 may extend around each opening 908 (e.g., eight in the illustrated example), with each surface 904 oriented at the same angle (e.g., 135 degrees) to the two other surfaces 904 that intersect the surface 904. Alternatively, a greater or fewer number of surfaces 904 may extend around each opening 908. Each of the surfaces 904 that frames an opening 908 intersects a single other surface 904, with each of the surfaces 904 that does not frame an opening 908 intersecting six surfaces 904 that frame an opening 908.

The surfaces 904 that frame an opening 908 can be joined with surfaces 904 that frame an opening 908 in another unit cell 900 to fluidly couple the unit cells 900, as shown in FIGS. 10 and 11. As described above, a first fluid can flow within the unit cells 900 within the interior volumes of the unit cells 900 while a second fluid flows outside of the unit cells 900 within exterior volumes located outside of and between the unit cells 900 without the first and second fluids mixing with each other. The first and second fluids can transfer heat between the fluids to cool one of these fluids.

Figure 12:
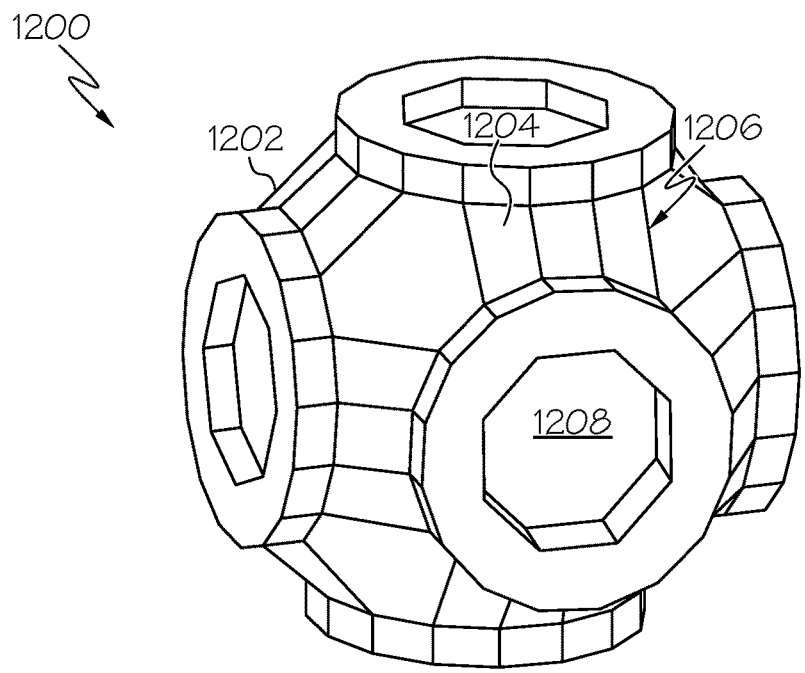
FIG. 12 illustrates a perspective view of one example of a multi-faceted unit cell.
Figure 13:
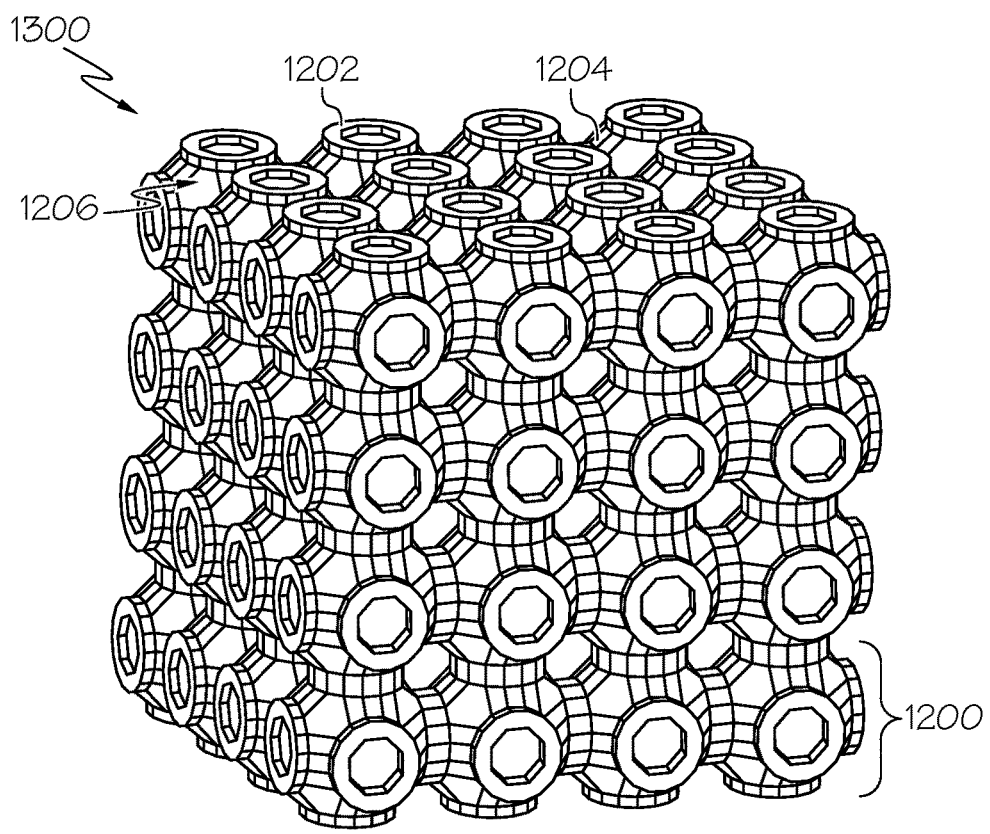
FIG. 13 illustrates a perspective view of a multi-faceted heat exchanger assembly formed from several of the unit cells shown in FIG. 12.

FIG. 12 illustrates a perspective view of one example of a multi-faceted unit cell 1200. FIG. 13 illustrates a perspective view of a multi-faceted heat exchanger assembly 1300 formed from several of the unit cells 1200 shown in FIG. 12. The multi-faceted unit cell 1200 includes a sidewall 1202 that is formed of several intersecting planar surfaces 1204. Optionally, one or more of the surfaces 1204 may be a curved surface having a radius of curvature.

The surfaces 1204 intersect each other along linear interface paths 1206. Alternatively, one or more of the interface paths 1206 may be curved. The surfaces 1204 are oriented at non-orthogonal angles. For example, the surfaces 1204 may be oriented at obtuse angles with respect to each other. The surfaces 1204 may be oriented relative to each other at larger angles than the surfaces 904 shown in FIG. 9.

The surfaces 1204 define or frame openings 1208 into the interior volume of the unit cell 1200. The openings 1208 of the unit cell 1200 are polygons (e.g., octagons, although the openings 1208 may have another polygon shape). Several of the surfaces 1204 may extend around each opening 1208. As shown in FIG. 12, the sidewall 1202 may be formed of more surfaces than the sidewall 902 shown in FIG. 9. The increased number of planar surfaces in the unit cell 1200 relative to the unit cell 900 can result in reduced fluid pressure drop and higher stress capability between fluids flowing within and outside of the unit cells 1200 than the unit cells 900. This can be the result of shape of the unit cells 1200 being closer to the smooth, curved surfaces of the unit cells 156 than the surfaces of the unit cells 108. But the increased number of surfaces in the unit cell 1200 also can require increased manufacturing costs over the lesser number of surfaces of the unit cell 900. As the number of surfaces forming a unit cell increases, the pressure drop through the unit cell structure may decrease and stress capability increase, but the manufacturing costs also may increase. Conversely, as the number of surfaces forming a unit cell decreases, the heat transfer through the sidewall of the unit cell may decrease, but the manufacturing costs also may decrease.

Figure 14:
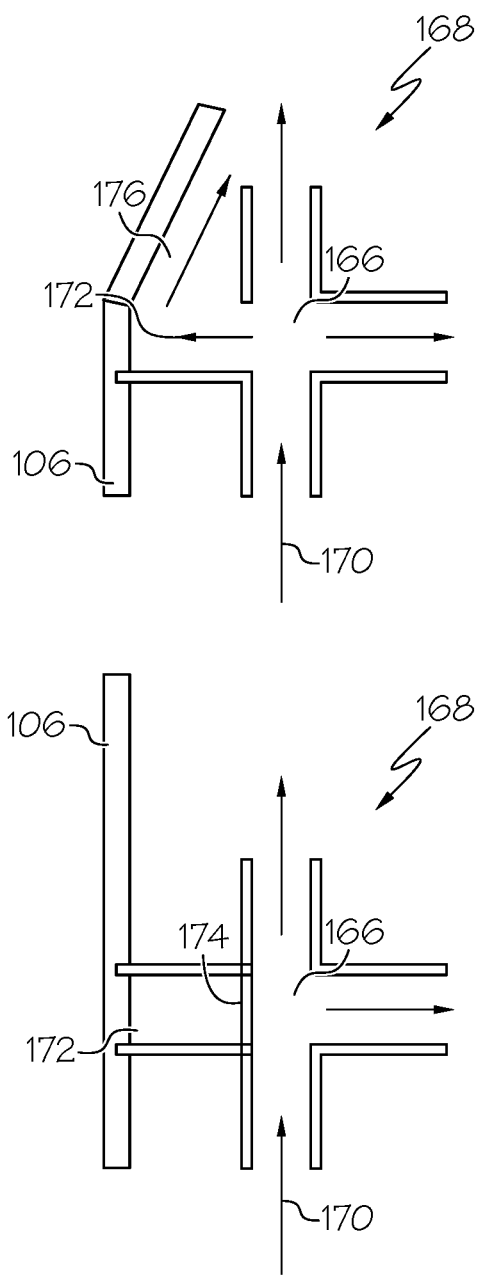
FIG. 14 is a schematic view of flow passages 166 adjacent a casing 106 of a heat exchanger or heat exchanger assembly.

FIG. 14 is a schematic view of flow passages 166 adjacent a casing 106 of a heat exchanger or heat exchanger assembly (e.g., 100 shown in FIG. 1). Flow passages 166 are formed by peripheral unit cells 168 such that fluid 170 flows through flow passages 166. The peripheral unit cells 168 can represent one or more of the unit cells described herein. Fluid 170 is one of first fluid 112 (shown in FIG. 1) and second fluid 116 (shown in FIG. 1). In alternative embodiments, fluid 170 is any fluid that enables heat exchanger 100 to operate as described herein. In the illustrated embodiment, flow passages 166 are configured to direct fluid 170 away from casing 106 to inhibit fluid 170 becoming trapped in a stagnant zone 172. Some flow passages 166 include a barrier 174 that inhibits fluid 170 entering stagnant zone 172. Some flow passages 166 include a channel 176 for fluid 170 to flow out of stagnant zone 172. In alternative embodiments, flow passages 166 are configured in another manner that enables heat exchanger 100 to operate as described herein. For example, in some embodiments, the peripheral unit cells 168 are configured such that fluid 170 flows through a geometric flow transition, such as the 180 degree turn in redirection portion 103 (shown in FIG. 1), while maintaining heat exchange throughout at least a portion of the geometric flow transition.

In some embodiments, components of heat exchanger 100, such as core 102, are used in applications not necessarily requiring heat exchange. For example, in some embodiments, components of heat exchanger 100 are used in reactor applications, mass transfer applications, phase-change applications, and solid oxide fuel cells (SOFC). In some embodiments of SOFC systems, unit cells 108 are positioned between anode-electrolyte-cathode layers. In some embodiments of phase-change systems, unit cells 108 include sidewalls 138 having small pores (not shown) and/or engineered surfaces (not shown) to allow fluids to boil and/or condense. In alternative embodiments, heat exchanger 100 is used for any applications and/or systems that require movement of fluid.

Figure 15:
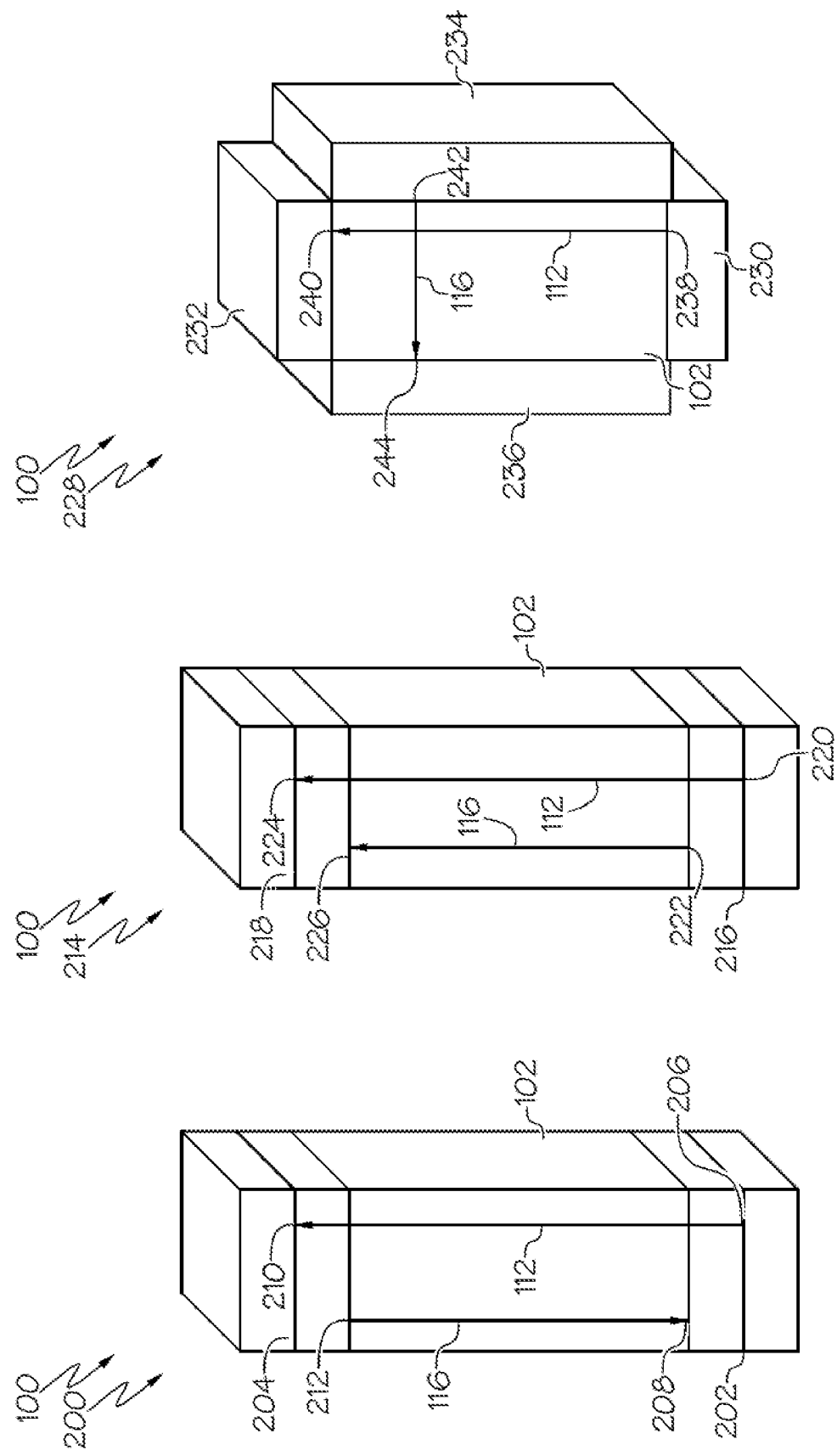
FIG. 15 is a schematic view of flow configurations of a heat exchanger or heat exchanger assembly.

FIG. 15 is a schematic view of flow configurations of a heat exchanger or heat exchanger assembly. The heat exchanger 100 can represent any of the heat exchangers or assemblies described herein. The heat exchanger is configured such that first fluid 112 and second fluid 116 flow through core 102 in multiple directions.

Manifold portion 104 is configured and/or coupled to core 102 in different locations such that first fluid 112 and second fluid 116 are directed through core 102 in different directions. Core 102 does not have to change shape, size, and/or arrangement of unit cells 108 to accommodate different locations and configurations of manifold portions 104. Moreover, the different configurations of core 102 and manifold portion 104 enable heat exchanger 100 to meet specific system requirements, such as shape, space, and piping requirements. For example, in some embodiments, manifold portions 104 are coupled to specific locations on core 102 that enable heat exchanger 100 to fit different spaces, shapes, and/or piping connections. In further embodiments, unit cells 108 are coupled together to form core 102 having a desired shape and flow configuration. In alternative embodiments, core 102 and manifold portion 104 have any configuration that enables heat exchanger 100 to operate as described herein.

In one embodiment, heat exchanger 100 is configured such that first fluid 112 and second fluid 116 flow through core 102 in a counter-flow configuration 200. In counter-flow configuration 200, a first manifold portion 202 and a second manifold portion 204 are coupled to opposed ends of core 102. First manifold portion 202 includes a first fluid inlet 206 and a second fluid outlet 208. Second manifold portion 204 includes a first fluid outlet 210 and a second fluid inlet 212. First fluid 112 is directed through core 102 from first fluid inlet 206 toward first fluid outlet 210 and second fluid 116 is directed through core 102 from second fluid inlet 212 toward second fluid outlet 208. As a result, first fluid 112 and second fluid 116 flow through core 102 in substantially opposed directions.

In another embodiment, heat exchanger 100 is configured such that first fluid 112 and second fluid 116 flow through core 102 in a parallel-flow configuration 214. In parallel-flow configuration 214, a first manifold portion 216 and a second manifold portion 218 are coupled to opposed ends of core 102. First manifold portion 216 includes a first fluid inlet 220 and a second fluid inlet 222. Second manifold portion 218 includes a first fluid outlet 224 and a second fluid outlet 226. First fluid 112 is directed through core 102 from first fluid inlet 220 toward first fluid outlet 224 and second fluid 116 is directed through core 102 from second fluid inlet 222 toward second fluid outlet 226. As a result, first fluid 112 and second fluid 116 flow through core 102 in substantially parallel directions.

In another embodiment, heat exchanger 100 is configured such that first fluid 112 and second fluid 116 flow through core 102 in a crossflow configuration 228. In crossflow configuration 228, first manifold portion 230 and second manifold portion 232 are coupled to opposed ends of core 102. Third manifold portion 234 and fourth manifold portion 236 are coupled to sides of core 102. First manifold portion 230 includes a first fluid inlet 238 and second manifold portion 232 includes a first fluid outlet 240. Third manifold portion 234 includes a second fluid inlet 242 and fourth manifold portion 236 includes a second fluid outlet 244. First fluid 112 is directed through core 102 from first fluid inlet 238 towards first fluid outlet 240. Second fluid 116 is directed through core 102 from second fluid inlet 242 towards second fluid outlet 244. As a result, first fluid 112 and second fluid 116 flow through core 102 in substantially transverse directions. In particular, the flow of first fluid 112 is substantially perpendicular to the flow of second fluid 116.

Figure 16:
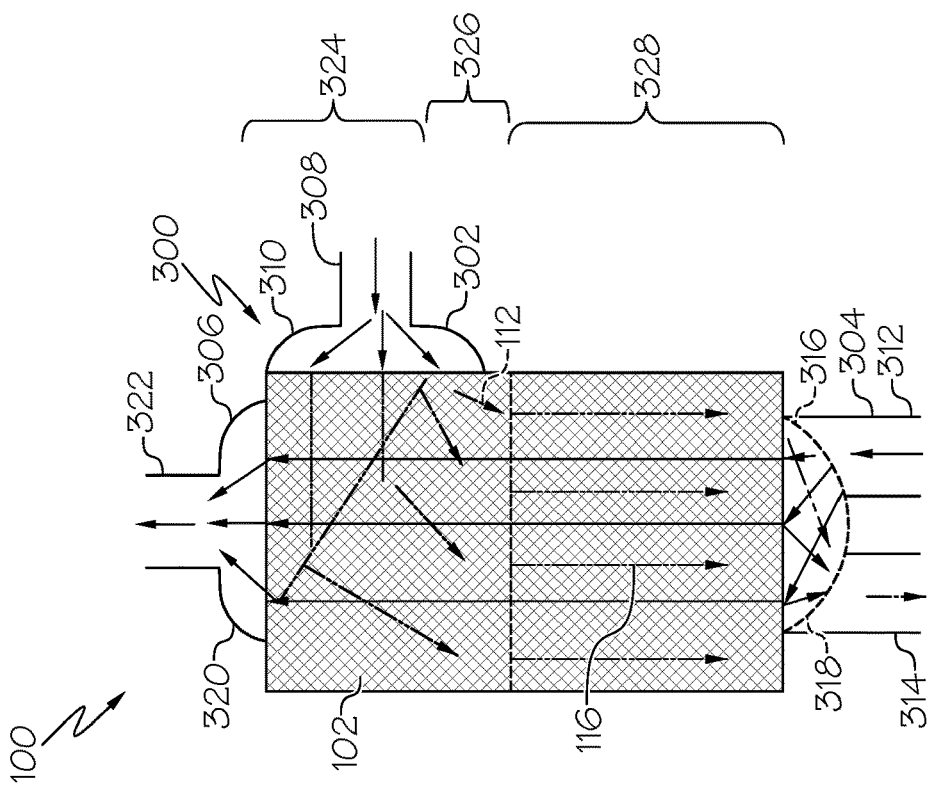
FIG. 16 is a schematic view of a hybrid counter-flow configuration of a heat exchanger or assembly.

FIG. 16 is a schematic view of a hybrid counter-flow configuration 300 of a heat exchanger or assembly. In hybrid counter-flow configuration 300, a first manifold portion 302 is coupled to a side of core 102. A second manifold portion 304 and a third manifold portion 306 are coupled to opposed ends of core 102. First manifold portion 302 includes a first fluid inlet 308 and a first header 310. Second manifold portion 304 includes a second fluid inlet 312, a first fluid outlet 314, a second header 316, and a third header 318. Third manifold portion 306 includes a fourth header 320 and a second fluid outlet 322. First fluid 112 is directed through core 102 from first fluid inlet 308 and first header 310 towards second header 316 and first fluid outlet 314. First fluid 112 is at least partially redirected as first fluid 112 flows through core 102. Second fluid 116 is directed through core 102 from second fluid inlet 312 and third header 318 towards fourth header 320 and second fluid outlet 322. As a result, the flow configurations of first fluid 112 and second fluid 116 vary through regions of core 102. First fluid 112 and second fluid 116 flow through a crossflow region 324, a hybrid flow region 326, and a counter-flow region 328. In crossflow region 324, first fluid 112 and second fluid 116 flow in substantially transverse directions. In hybrid flow region 326, the directions of flow of first fluid 112 and second fluid 116 change in relation to each other such that the flows are partially transverse and partially opposed. In hybrid flow region 326, a portion of the flows of first fluid 112 and second fluid 116 are diagonal to each other. In counter-flow region 328, first fluid 112 and second fluid 116 flow in substantially opposed directions.

Figure 17:
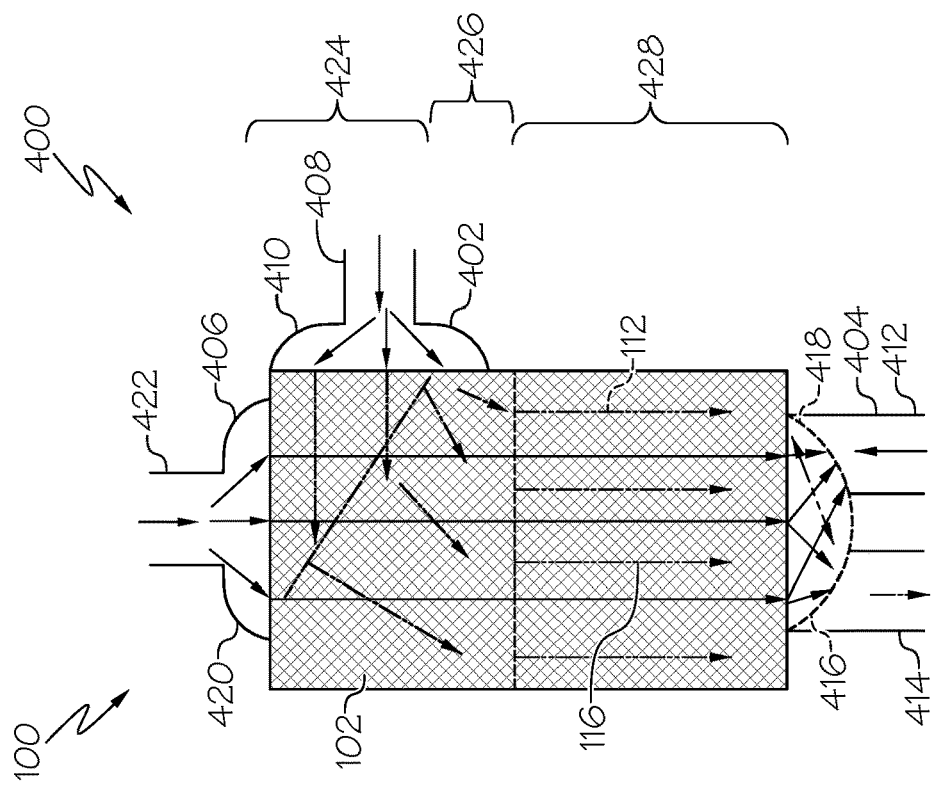
FIG. 17 is a schematic view of a hybrid parallel flow configuration 400 of heat exchanger or assembly.

FIG. 17 is a schematic view of a hybrid parallel flow configuration 400 of heat exchanger or assembly 100. In hybrid parallel flow configuration 400, a first manifold portion 402 is coupled to a side of core 102. A second manifold portion 404 and a third manifold portion 406 are coupled to opposed ends of core 102. First manifold portion 402 includes a first fluid inlet 408 and a first header 410. Second manifold portion 404 includes a second fluid outlet 412, a first fluid outlet 414, a second header 416, and a third header 418. Third manifold portion 406 includes a fourth header 420 and a second fluid inlet 422. First fluid 112 is directed through core 102 from first fluid inlet 408 and first header 410 towards second header 416 and first fluid outlet 414. First fluid 112 is at least partially redirected as first fluid 112 flows through core 102. Second fluid 116 is directed through core 102 from second fluid inlet 422 and fourth header 420 towards third header 418 and second fluid outlet 412. As a result, the flow configurations of first fluid 112 and second fluid 116 vary through regions of core 102. First fluid 112 and second fluid 116 flow through a crossflow region 424, a hybrid flow region 426, and a parallel flow region 428. In crossflow region 424, first fluid 112 and second fluid 116 flow in substantially transverse directions. In hybrid flow region 426, the directions of flow of first fluid 112 and second fluid 116 change in relation to each other such that the flows are partially transverse and partially parallel. In hybrid flow region 426, a portion of the flows of first fluid 112 and second fluid 116 are diagonal to each other. In parallel flow region 428, first fluid 112 and second fluid 116 flow in substantially parallel directions.

In alternative embodiments, first fluid 112 and second fluid 116 flow through core 102 in any directions that enable heat exchanger 100 to operate as described herein. For example, in some embodiments, at least one of first fluid 112 and second fluid 116 is redirected as first fluid 112 and/or second fluid 116 flows through core 102. In further embodiments, first fluid 112 and second fluid 116 flow through core 102 in any of the following flow configurations, without limitation: counter-flow, parallel flow, crossflow, and combinations thereof. Moreover, in some embodiments, first fluid 112 and second fluid 116 flow through core 102 in any of the following directions relative to each other, without limitation: diagonal, curved, perpendicular, parallel, transverse, and combinations thereof.

Figure 18:
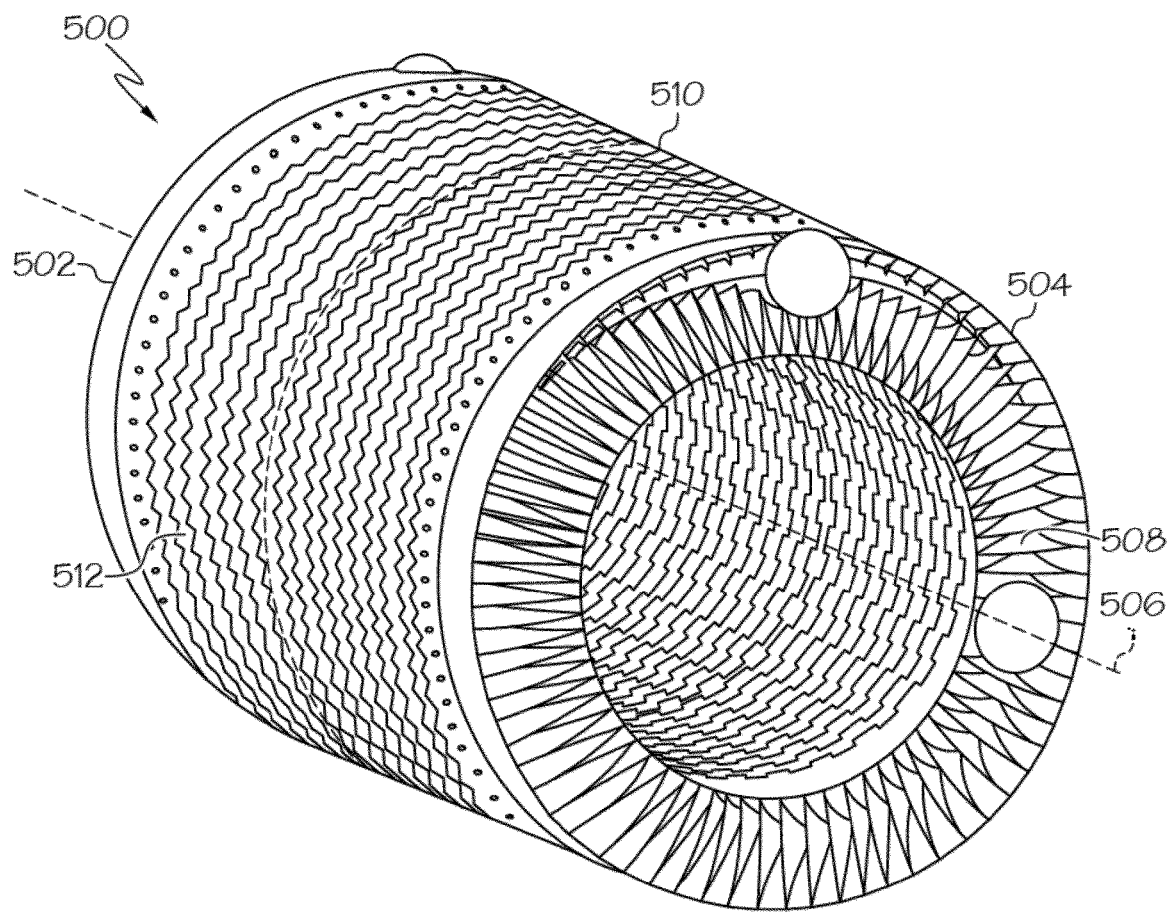
FIG. 18 is an isometric view of heat exchanger core having an annular shape.

FIG. 18 is an isometric view of heat exchanger core 500 having an annular shape. Heat exchanger core 500 forms a ring-shaped cylinder. Heat exchanger core 500 has a first end 502, a second end 504, and an axis 506 extending through first end 502 and second end 504. An inner surface 508 extends between first end 502 and second end 504 and around axis 506. An outer surface 510 extends between first end 502 and second end 504 and is spaced radially from inner surface 508. In alternative embodiments, heat exchanger core 500 has any shape that enables heat exchanger core 500 to operate as described herein. For example, in some embodiments, heat exchanger core 500 has an at least partially annular shape with an eccentric opening.

Figure 19:
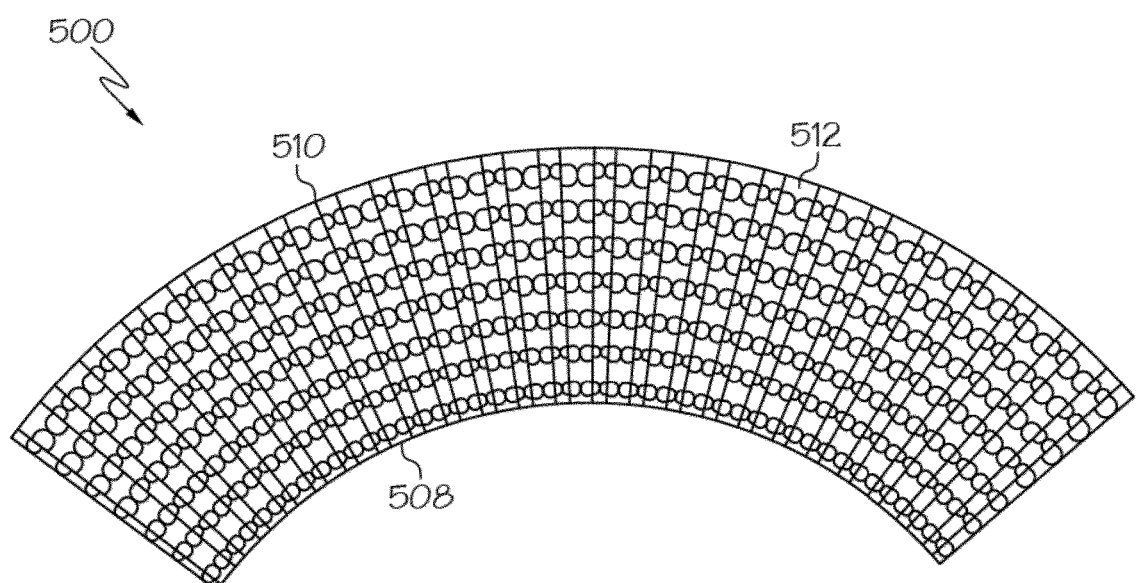
FIG. 19 is a sectional view of a portion of heat exchanger core.

FIG. 19 is a sectional view of a portion of heat exchanger core 500. Heat exchanger core 500 includes a plurality of unit cells 512. Unit cells 512 are arranged along an arc such that unit cells 512 maintain a constant spacing from inner surface 508 and outer surface 510. Moreover, unit cells 512 are at least partially curved. Accordingly, unit cells 512 conform to the shape of heat exchanger core 500. As a result, heat exchanger core 500 utilizes an increased amount of available space and reduces waste. In addition, unit cells 512 allow heat exchanger core 500 to have a desired shape for a specified system and/or application. In alternative embodiments, unit cells 512 are arranged in any manner and have any shapes that enable heat exchanger core 500 to operate as described herein. For example, in some embodiments, unit cells 512 are linearly arranged such that aligned unit cells 512 are not constantly spaced from inner surface 508 and outer surface 510. In further embodiments, unit cells 512 have differing shapes that facilitate unit cell 512 conforming to heat exchanger core 500.

Figure 20:
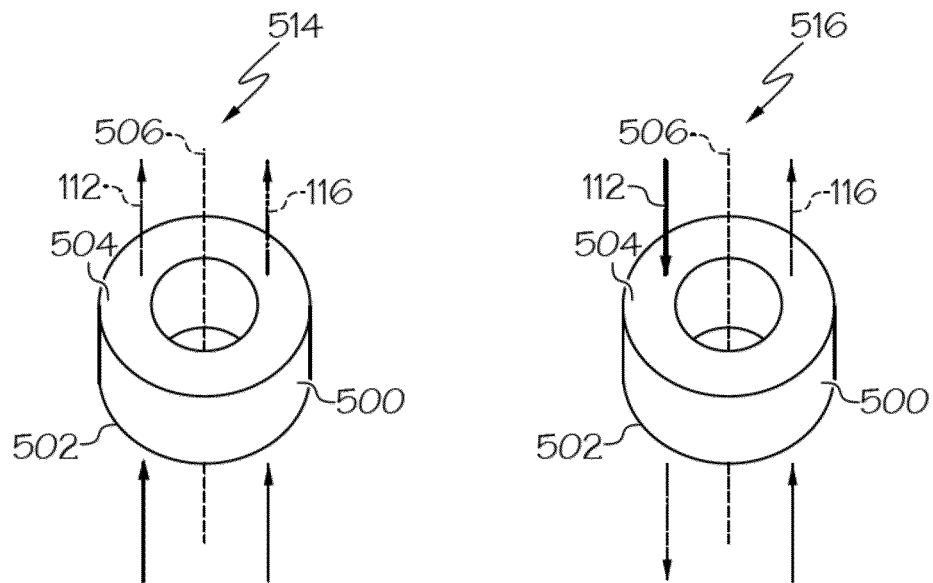
FIG. 20 is a schematic view of axial flow configurations of heat exchanger core.

FIG. 20 is a schematic view of flow configurations of heat exchanger core 500. In an axial parallel flow configuration 514, heat exchanger core 500 is configured such that first fluid 112 and second fluid 116 flow through heat exchanger core 500 from first end 502 toward second end 504. As such, first fluid 112 and second fluid 116 flow through heat exchanger core 500 in directions parallel to axis 506. In an axial counter-flow configuration 516, heat exchanger core 500 is configured such that first fluid 112 flows from second end 504 toward first end 502 and second fluid 116 flows from first end 502 toward second end 504. As such, first fluid 112 and second fluid 116 flow through heat exchanger core 500 in opposed directions parallel to axis 506.

Figure 21:
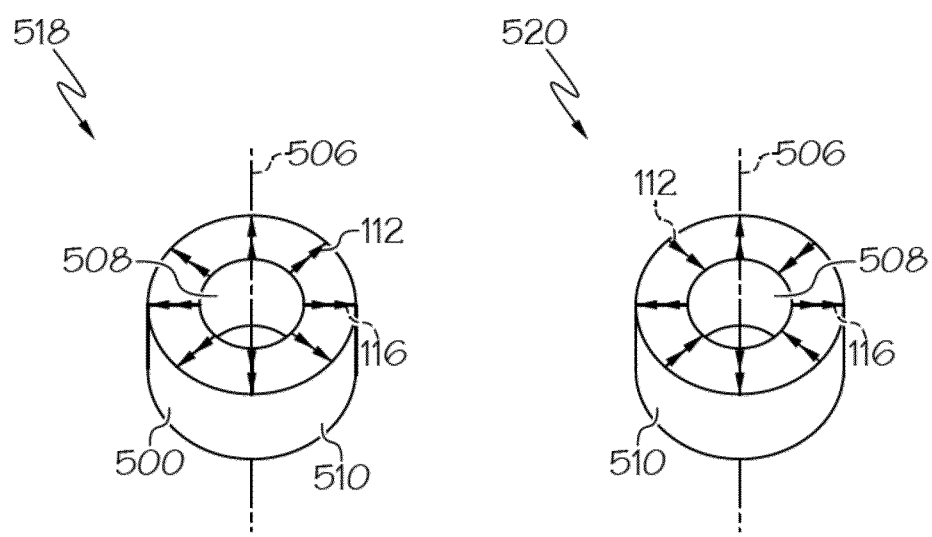
FIG. 21 is a schematic view of radial flow configurations of heat exchanger core.

FIG. 21 is a schematic view of radial flow configurations of heat exchanger core 500. In a radial parallel flow configuration 518, heat exchanger core 500 is configured such that first fluid 112 and second fluid 116 flow from inner surface 508 toward outer surface 510. As such, first fluid 112 and second fluid 116 flow through heat exchanger core 500 in directions that are perpendicular to axis 506. In an axial counter-flow configuration 520, heat exchanger core 500 is configured such that first fluid 112 flows from outer surface 510 toward inner surface 508 and second fluid 116 flows from inner surface 508 toward outer surface 510. As such, first fluid 112 and second fluid 116 flow through heat exchanger core 500 in opposed directions that are perpendicular to axis 506.

Figure 22:
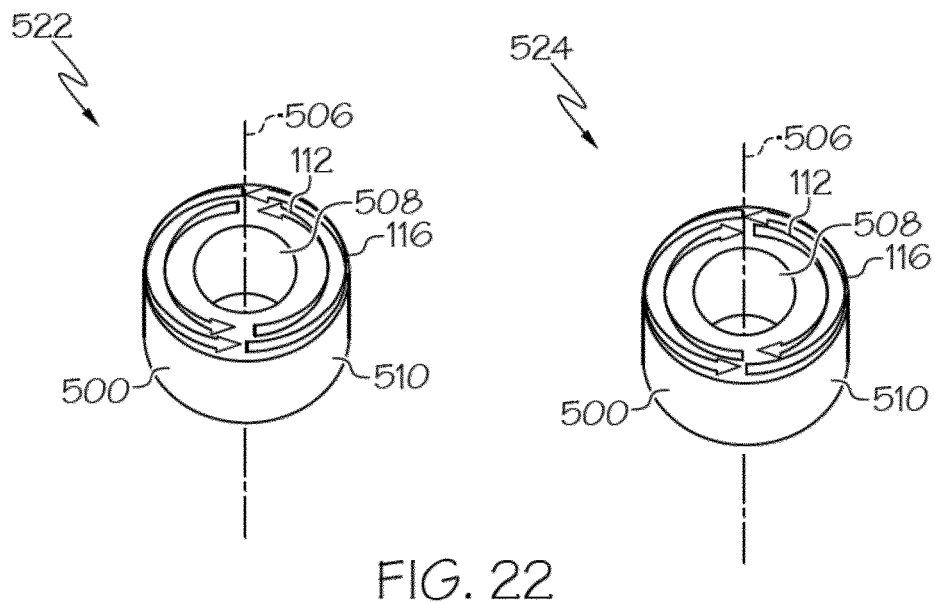
FIG. 22 is a schematic view of circumferential flow configurations of heat exchanger core.

FIG. 22 is a schematic view of circumferential flow configurations of heat exchanger core 500. In a circumferential parallel flow configuration 522, first fluid 112 and second fluid 116 flow through heat exchanger core 500 along at least partially curved paths between inner surface 508 and outer surface 510. First fluid 112 and second fluid 116 flow circumferentially about axis 506. In a circumferential counter-flow configuration 524, first fluid 112 and second fluid 116 flow through heat exchanger core 500 along at least partially curved paths between inner surface 508 and outer surface 510. First fluid 112 flows in a clockwise direction about axis 506 and second fluid 116 flows in a counterclockwise direction about axis 506. In alternative embodiments, first fluid 112 and second fluid 116 flow through heat exchanger core 500 in any directions that enable heat exchanger core 500 to operate as described herein. For example, in some embodiments, first fluid 112 flows in an axial direction and second fluid 116 flows in a radial direction. In further embodiments, first fluid 112 flows in an axial direction and second fluid flows in a circumferential direction. In still further embodiments, first fluid 112 flows in a radial direction and second fluid flows in a circumferential direction.

Figure 23:
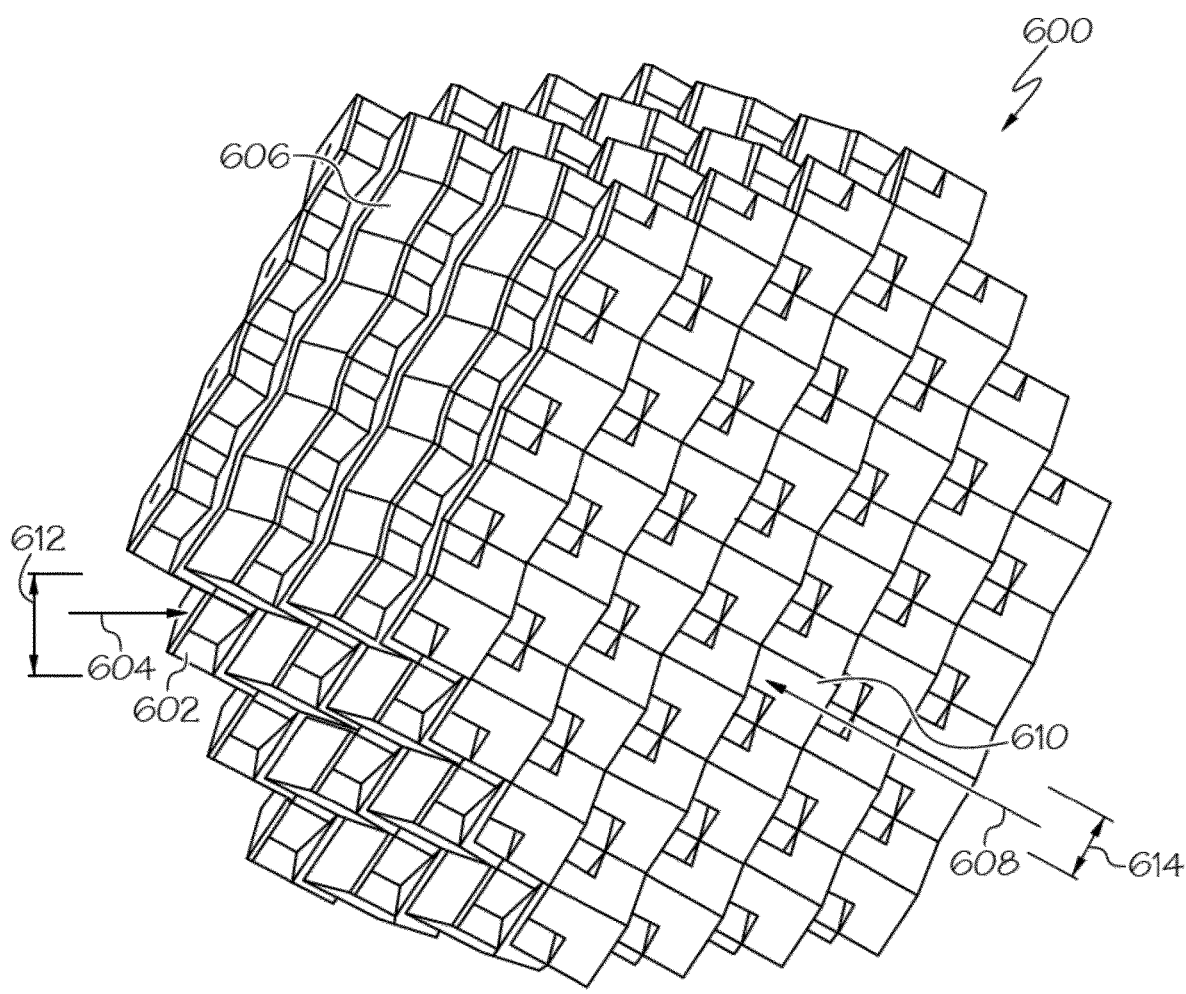
FIG. 23 is schematic view of a heat exchanger core including a first passageway for gas flow.

FIG. 23 is schematic view of a heat exchanger core 600 including a first passageway 602 for gas flow 604. Heat exchanger core 600 has a hexagonal cross-sectional shape. In alternative embodiments, heat exchanger core 600 has any shape that enables heat exchanger core 600 to operate as described herein. In the exemplary embodiment, heat exchanger core 600 includes a plurality of unit cells 606 that are configured to facilitate heat exchange between gas flow 604 and another fluid such as liquid flow 608. Unit cells 606 form first passageway 602 for gas flow 604 and a second passageway 610 for liquid flow 608. First passageway 602 has a first hydraulic diameter 612 that is greater than a second hydraulic diameter 614 of second passageway 610. In some embodiments, the ratio of first hydraulic diameter 612 to second hydraulic diameter 614 is at least 2:1. In further embodiments, the ratio of first hydraulic diameter 612 to second hydraulic diameter 614 is at least 4:1. In alternative embodiments, unit cells 606 have any configuration that enables heat exchanger to operate as described herein. For example, in some embodiments, dimensions of unit cells 606, such as sidewall thickness and height, are altered to adjust the flow area available for at least one of the fluids. In further embodiments, extended surfaces such as parallel fins, helical strakes, and pin fins extend adjacent the path of gas flow 604.

Figure 24:
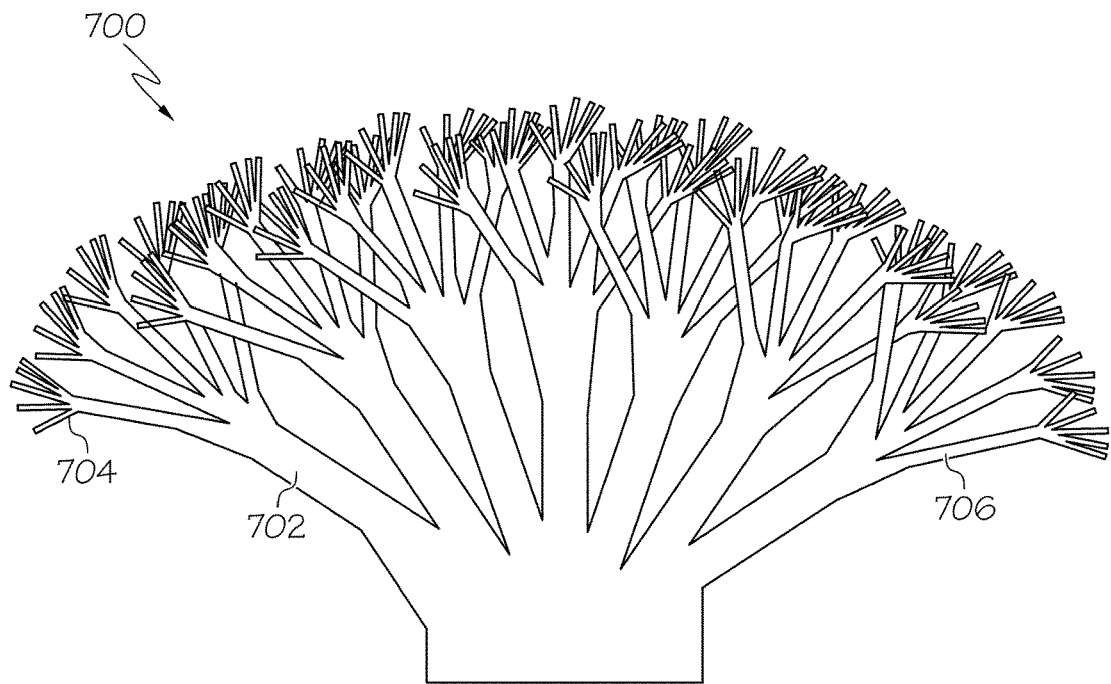
FIG. 24 is a schematic view of a tiered manifold portion for use with heat exchanger.

FIG. 24 is a schematic view of a tiered manifold portion 700 for use with a heat exchanger. Tiered manifold portion 700 includes conduits 702 and a plurality of tiered junctions 704. The plurality of junctions 704 couple multiple conduits 702 in fluid communication such that conduits 702 define a passageway 706. As fluid flows through passageway 706, the stream of fluid is split from a relatively large inlet stream into successively smaller streams. In some embodiments, the tiered manifold portion 700 supplies first fluid 112 (shown in FIG. 2) and/or second fluid 116 (shown in FIG. 2) to core 102 (shown in FIG. 1). In further embodiments, the tiered manifold portion 700 receives first fluid 112 (shown in FIG. 2) and/or second fluid 116 (shown in FIG. 2) from core 102 (shown in FIG. 1) and progressively combines relatively small outlet streams into successively larger outlet streams for discharge from one or more outlet ports. In alternative embodiments, tiered manifold portion 700 has any configuration that enables heat exchanger 100 (shown in FIG. 1) to operate as described herein.

Figure 25:
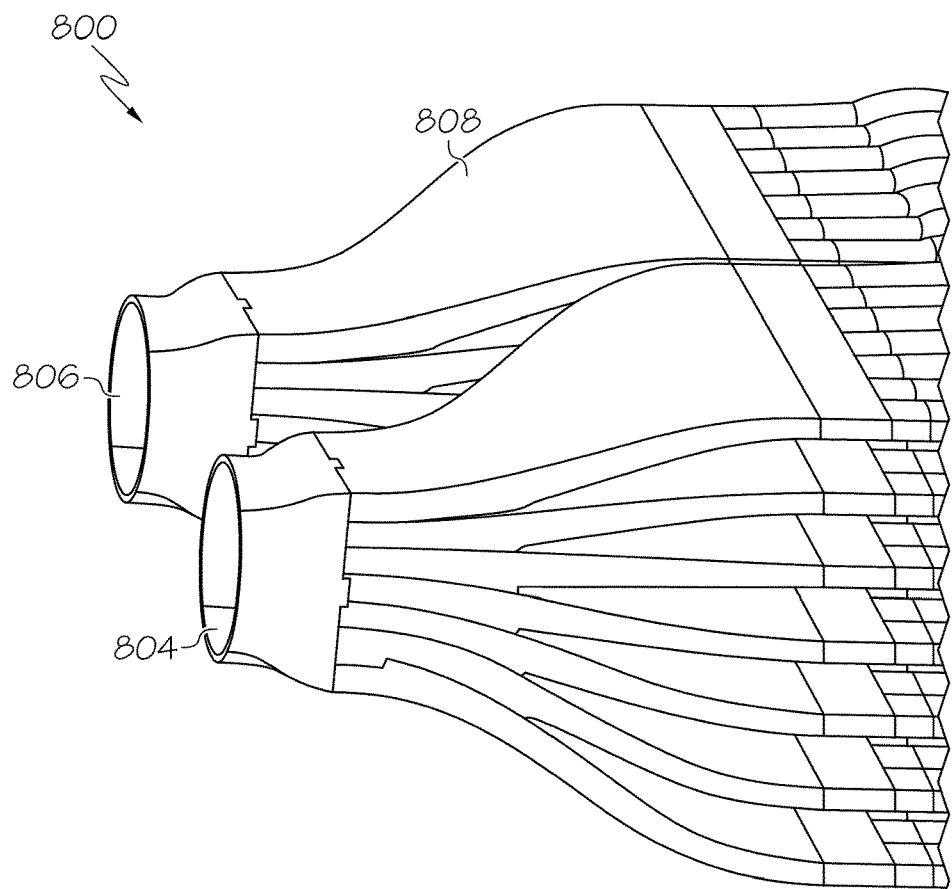
FIG. 25 is a schematic view of a planar manifold portion for use with heat exchanger.
Figure 26:
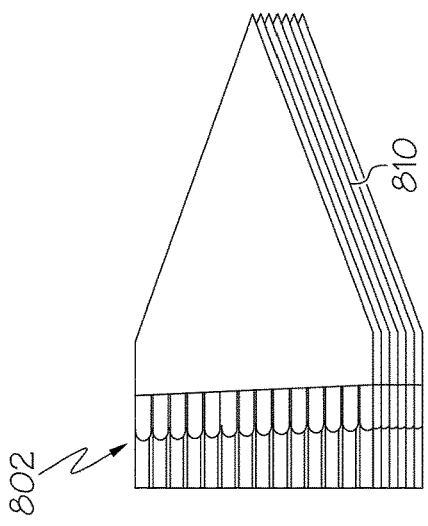
FIG. 26 is a schematic view of a planar turning portion for use with heat exchanger.

FIG. 25 is a schematic view of a planar manifold portion 800 for use with heat exchanger 100. FIG. 26 is a schematic view of a planar turning portion 802 for use with heat exchanger 100. Planar manifold portion 800 includes an inlet 804, an outlet 806, and a plurality of manifold conduits 808 having a planar shape. Planar turning portion 802 includes a plurality of turn conduits 810 having a planar shape. Planar turning portion 802 is configured to redirect fluid flowing through turn conduits 810. The planar shape of manifold conduits 808 of planar manifold portion 800 and turn conduits 810 of planar turning portion 802 facilitates an even flow distribution of fluid into, through, and/or out of core 102 (shown in FIG. 1). In alternative embodiments, planar manifold portion 800 and planar turning portion 802 have any configurations that enable heat exchanger 100 (shown in FIG. 1) to operate as described herein. For example, in some embodiments, at least one of planar manifold portion 800 and planar turning portion 802 is omitted.

Figure 27:
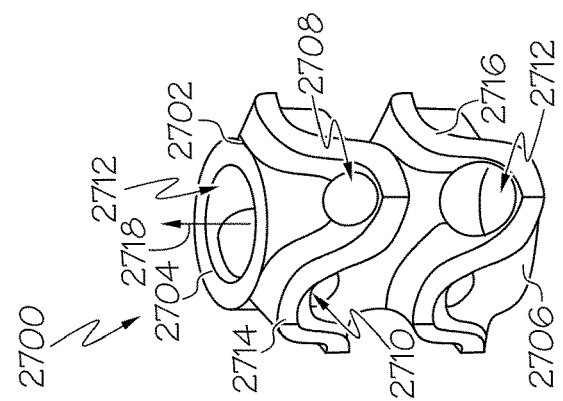
FIG. 27 is a perspective view of a faceted unit cell for one or more of the heat exchangers or heat exchanger assemblies described herein.
Figure 28:
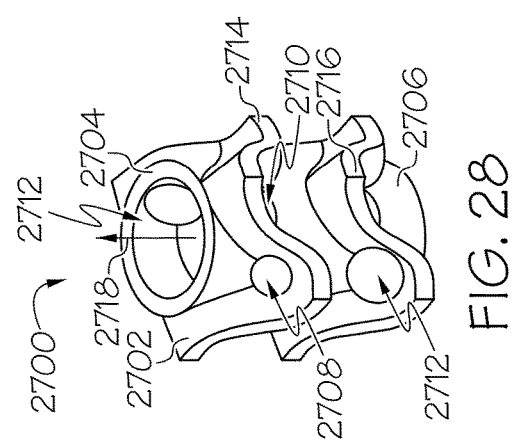
FIG. 28 is another perspective view of the faceted unit cell shown in FIG. 27.

FIGS. 27 and 28 are perspective views of a unit cell 2700 for one or more of the heat exchangers or heat exchanger assemblies described herein. The unit cell 2700 is a hexagonal unit cell formed from a sidewall 2702 that forms annular rings 2704, 2706 on opposite ends of the unit cell 2700 with several (e.g., twelve) angled openings 2708, 2710 disposed between the annular rings 2704, 2706. A different number of the angled openings 2708, 2710 than what is shown may be provided. The sidewall 2702 is shown as a multifaceted wall formed from several planar surfaces, but optionally can be a smooth, curved surface like the curved surfaces 184 shown in FIG. 5.

Each of the annular rings 2704, 2706 has the shape of a circle, but optionally can have the shape of an oval or another rounded shape, or the shape of a polygon. The shape of the annular rings 2704, 2706 may be the same or one ring 2704 may have a different shape than the other ring 2706.

As with the sidewalls of the other unit cells described herein, the unit cell 2700 is a furcated cell having the sidewall 2702 that divides the unit cell 2700 into different passageways 2701, 2703 (labeled in FIGS. 29 through 36). Different fluids can flow through the different passageways 2701, 2703 and exchange heat through the sidewall 2702 without these fluids mixing with each other.

Figure 37:
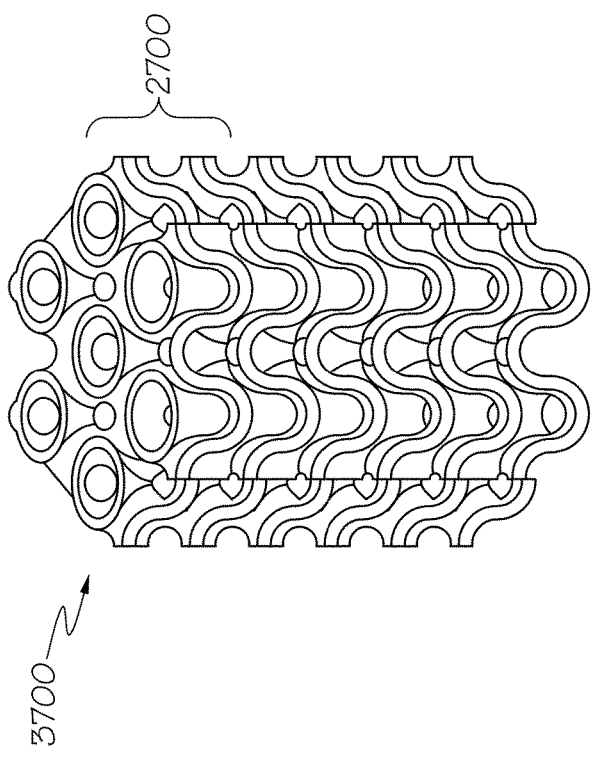
FIG. 37 illustrates a perspective view of a heat exchanger or heat exchanger assembly formed from several of the unit cells shown in FIGS. 27 and 28.
Figure 30:
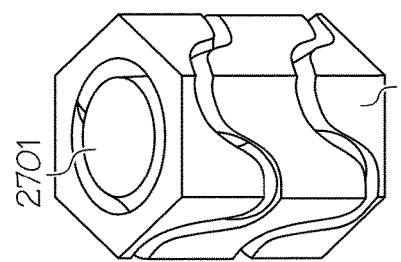
FIG. 30 illustrates the intertwined passageways formed by the unit cell shown in FIG. 28.

The sidewalls 2702 of several unit cells 2700 can be joined together to fluidly couple the interior passageways of the unit cells 2700 with each other and to form fluidly coupled external passageways with the volumes that are outside of the unit cells 2700. FIG. 37 illustrates a perspective view of a heat exchanger or heat exchanger assembly 3700 formed from several of the unit cells 2700 shown in FIGS. 27 and 28 coupled together.

Each of the annular rings 2704, 2706 defines and frames an opening 2712 into the passageways 2701 of the unit cell 2700. The sidewall 2702 also includes undulating rings 2714, 2716 that extend around and encircle the interior volume of the unit cell 2700. While only two undulating rings 2714, 2716 are shown, the unit cell 2700 optionally can include a single undulating ring 2714 or 2716, or may include more than two undulating rings 2714, 2716. The unit cell 2700 can be elongated along a center axis 2718 with each of the rings 2704, 2706, 2714, 2716 encircling and located at a different location along the axis 2718. The annular rings 2704, 2706 may be disposed radially closer to the axis 2718 than the undulating rings 2714, 2716. Alternatively, the annular rings 2704, 2706 and the undulating rings 2714, 2716 may be disposed at the same radial distance from the axis 2718, or the annular rings 2704, 2706 may be disposed radially farther from the axis 2718 than the undulating rings 2714, 2716.

The undulating rings 2714, 2716 include waves or undulations that partially extend around the different angled openings 2708, 2710 into the unit cell 2700. For example, the angled openings 2708 are disposed on one side of each undulating ring 2714, 2716 with the angled openings 2710 disposed on an opposite side of each undulating ring 2714, 2716. Stated differently, with respect to the undulating ring 2714, the angled openings 2708 are located between the undulating ring 2714 and the annular ring 2704. The angled openings 2710 can be located between the undulating ring 2714 and the annular ring 2706. With respect to the undulating ring 2716, the angled openings 2708 are located between the undulating ring 2716 and the annular ring 2706.

The angled openings 2710 are located between the undulating ring 2716 and the annular ring 2704.

Figure 35:
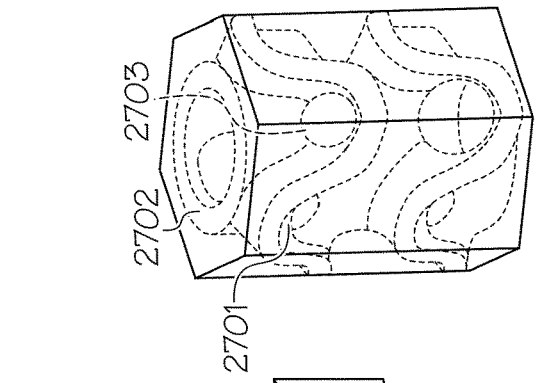
FIG. 35 illustrates a perspective view of a combination of a sidewall of the unit cell and the intertwined passageways shown in FIGS. 27 through 33, odd only.
Figure 33:
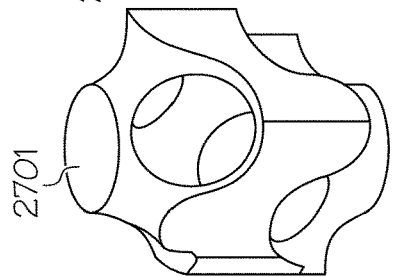
FIG. 33 illustrates another one of the intertwined passageways shown in FIG. 29.
Figure 31:
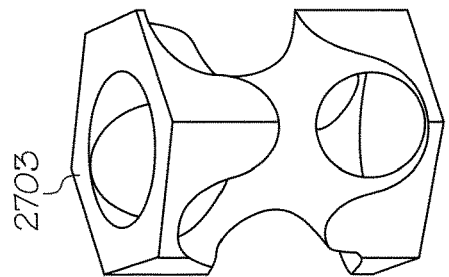
FIG. 31 illustrates one of the intertwined passageways shown in FIG. 29.
Figure 29:
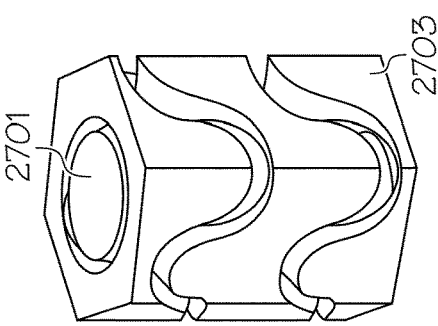
FIG. 29 illustrates the intertwined passageways formed by the unit cell shown in FIG. 27.
Figure 36:
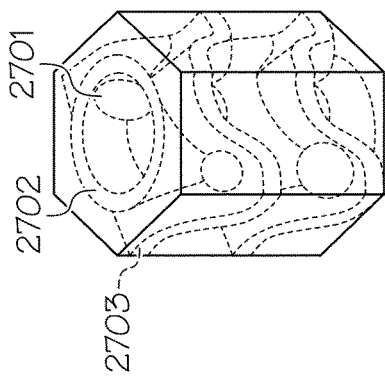
FIG. 36 illustrates a perspective view of a combination of a sidewall of the unit cell and the intertwined passageways shown in FIGS. 28 through 34, even only.
Figure 34:
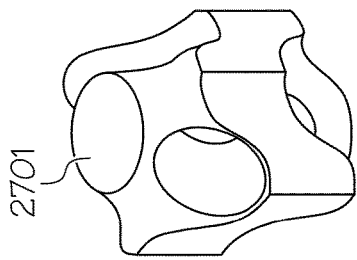
FIG. 34 illustrates another one of the intertwined passageways shown in FIG. 30.
Figure 32:
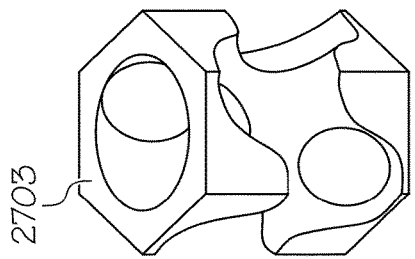
FIG. 32 illustrates the intertwined passageway shown in FIG. 30.

In contrast to the other unit cells described herein, the sidewall 2702 of the unit cell 2700 forms the intertwined passageways 2701, 2703 that both extend through the interior of the unit cell 2700 without allowing the fluids flowing in the passageways 2701, 2703 from mixing with each other. With continued reference to the sidewall 2702 shown in FIGS. 27 and 28, FIGS. 29 and 30 illustrate the intertwined passageways 2701, 2703 formed by the unit cell 2700 along different perspective views, FIGS. 31 and 32 illustrate one of the intertwined passageways 2701 along different perspective views, FIGS. 33 and 34 illustrate the other of the intertwined passageways 2703 along different perspective views, and FIGS. 35 and 36 illustrate different perspective views of a combination of the sidewall 2702 of the unit cell 2700 and the intertwined passageways 2701, 2703.

Part of each passageway 2701, 2703 is formed by, or is disposed between, unit cells 2700 that are coupled with each other. As shown, the sidewall 2702 forms the passageways 2701, 2703 such that both passageways 2701, 2703 extend through the interior of the unit cell 2700 without the passageways 2701, 2703 fluidly coupling with each other. The passageway 2701 extends into the unit cell 2700 through the opening 2712 of the annular ring 2704 and separates or divides into three different passages or conduits toward and out of the angled openings 2710 below the undulating ring 2714. This passageway 2701 also extends down toward and out of the angled openings 2710 above the undulating ring 2716 and toward and out of the opening 2712 of the annular ring 2706. The fluid that flows through the passageway 2701 can be received into the unit cell 2700 through one or more of these openings and exit out of the unit cell 2700 through one or more other openings of these openings. The passageway 2703 extends into the unit cell 2700 through the angled openings 2708 of one undulating ring 2714, moves through the interior of the unit cell 2700, and exits the unit cell 2700 through the angled openings 2708 of the other undulating ring 2716.

Each of the passageways 2701, 2703 separates flow of the corresponding fluid into at least three other flows. The unit cells shown in FIGS. 27 through 36 separate flow of a fluid received in a first direction into at least three orthogonally oriented flows along second, third, and fourth directions with the first, second, third, and fourth directions not being orthogonal to each other, but being oriented along acute angles with respect to each other. FIG. 37 illustrates a perspective view of a multi-faceted heat exchanger assembly 3700 formed from several of the hexagonal unit cells 2700 shown in FIGS. 27 and 28.

The passageways 2701, 2703 can provide for increased desired heat exchanger characteristics between the different fluids separately flowing through these passageways 2701, 2703 relative to one or more other embodiments described herein. This can be due to the interwoven nature of the passageways 2701, 2703 providing for increased surface areas of the sidewall 2702 that each of the fluids contacts during flow through each unit cell 2700.

The heat exchangers and heat exchanger assemblies described herein can be shaped to conform to a wide variety of shapes so that the heat exchangers and assemblies can be formed to fill more of a volume than other currently known heat exchangers. This can result in the heat exchangers being able to exchange heat between the fluids throughout larger volumes when compared to heat exchangers that do not conform (e.g., match) the shape of the volumes in which the heat exchangers are disposed.

Figure 38:
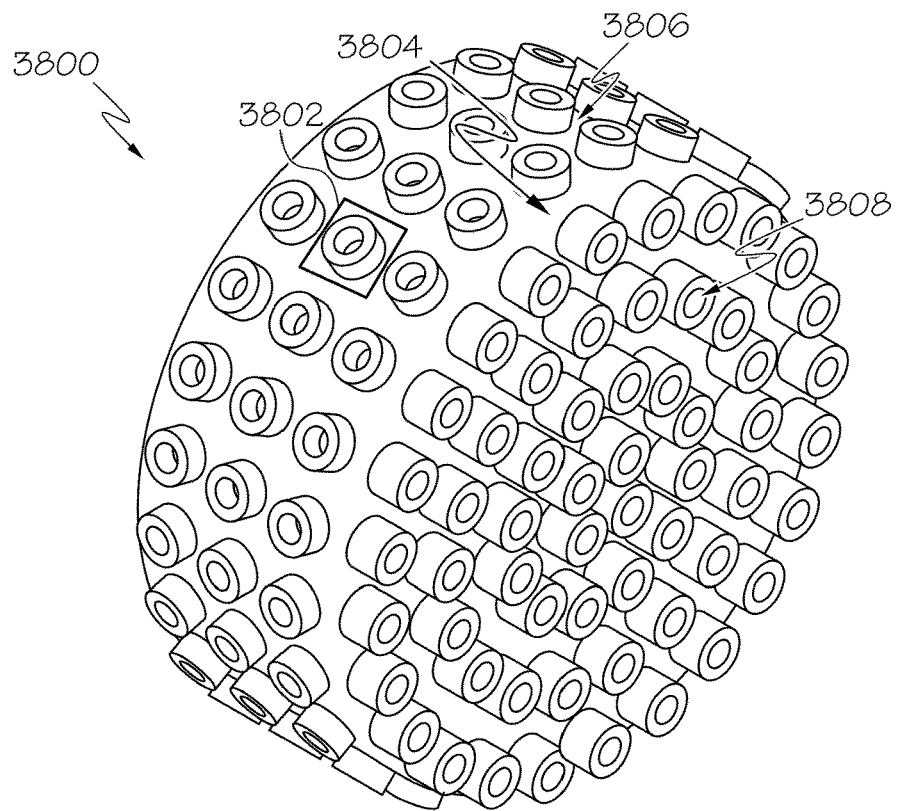
FIG. 38 illustrates one example of a puck-shaped heat exchanger formed of several unit cells.

FIG. 38 illustrates one example of a puck-shaped heat exchanger 3800 formed of several unit cells 3802. The unit cells 3802 can be one or more of the unit cells described herein that form separate passageways for the transfer of heat between fluids, as described above. As shown, the shapes and dimensions of the unit cells 3802 (including openings 3808 of the unit cells 3802) can change at or near edges 3804 of the heat exchanger 3800 and along rounded sides 3806 of the heat exchanger 3800. This results in the unit cells 3802 being repeated throughout the entirety of the heat exchanger 3800 (instead of the edges 3804 or rounded sides 3806 not including any unit cell 3802).

Figure 39:
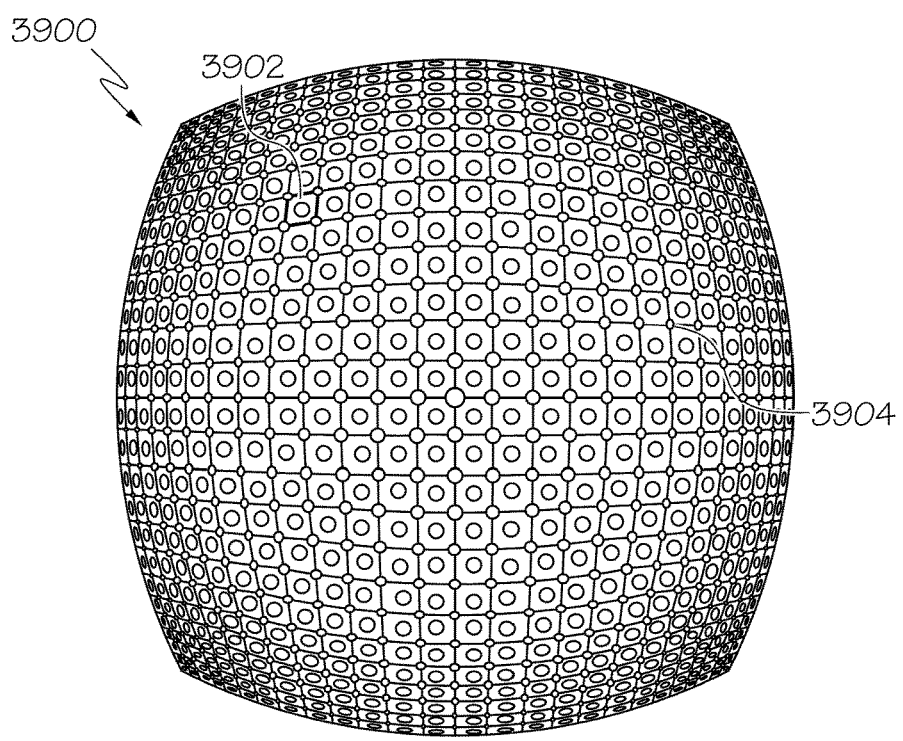
FIG. 39 illustrates one example of a heat exchanger formed of several unit cells and in the shape of a bloated cube.

FIG. 39 illustrates one example of a heat exchanger 3900 formed of several unit cells 3902 and in the shape of a bloated cube. For example, the heat exchanger 3900 has the shape of a cube with the sides of the cube having convex, curved shapes. The unit cells 3902 can represent one or more of the unit cells described herein. As shown, the shape and/or size of openings 3904 of the unit cells 3902 can change to accommodate the shape of the heat exchanger 3900. This can help ensure that the heat exchanger 3900 fills more of a defined volume (e.g., a bloated cube) while still transferring heat between the fluids flowing through the unit cells 3902.

The dimensions of the unit cells forming a heat exchanger may vary across or throughout the heat exchanger to account for the edges, rounded sides, or other changes in shape of the heat exchanger. For example, sizes of openings, the shape of the sidewalls, etc., can be different for the unit cells at edges of the heat exchanger than in other locations of the heat exchanger. Figure The above-described systems and methods include a core that enables heat exchangers to have different shapes, sizes, and flow configurations. The core includes a plurality of unit cells. The unit cells define passageways for at least two different heat exchange fluids such that the fluids combine and divide in close proximity separated only by a sidewall of the unit cell. In some embodiments, each unit cell is configured to receive flows of heat exchange fluid from at least three other unit cells such that the flows combine into a single flow. In addition, each unit cell forms a trifurcated passageway portion such that the flow divides and is discharged into at least three other unit cells. As a result, the thermal boundary layers of the heat exchange fluids are reduced, and the heat exchange fluids more efficiently transfer heat through the sidewalls of the unit cells in comparison to heat exchange fluids in known heat exchangers. Moreover, the above-described heat exchangers include multiple arrangements and flow configurations to meet overall system requirements and have increased efficiency.

An exemplary technical effect of the methods, systems, and apparatus described herein includes at least one of: (a) increasing heat transfer efficiency of heat exchangers; (b) providing a heat exchanger core capable of use in multiple flow configurations; (c) providing a heat exchanger that is configured to meet system requirements such as size, shape, and piping; (d) increasing the flexibility of heat exchangers; (e) providing heat exchangers with different shapes; (f) reducing volume of heat exchangers; (g) reducing weight of heat exchangers; (h) providing a monolithic structure for use as a heat exchanger core; and (i) decreasing the size of passageways for fluid flow through heat exchanger cores.

Exemplary embodiments of a heat exchanger assembly are described above in detail. The assembly is not limited to the specific embodiments described herein, but rather, components of systems and/or steps of the methods may be utilized independently and separately from other components and/or steps described herein. For example, the configuration of components described herein may also be used in combination with other processes and is not limited to practice with only heat exchangers and related methods as described herein. Rather, the exemplary embodiments can be implemented and utilized in connection with many applications where furcated passageways for fluid are desired.

In one or more embodiments, a heat exchanger is provided that can include furcating unit cells coupled with each other. Each of the unit cells can include a sidewall that defines several openings into an interior of the unit cell. At least a first opening of the openings can be configured to be an inlet to receive a first fluid into the unit cell and at least a second opening of the openings can be configured to be an outlet through which the first fluid exits the unit cell. The sidewall can define interior passageways through the interior of the unit cell that direct the first fluid into the unit cell. The sidewall can also divide flow of the first fluid into separate orthogonal flows through the interior passageways and out of the unit cell. The unit cells can be coupled with each other with the sidewalls of the unit cells separating exterior volumes outside of the unit cells from the interior passageways of the unit cells. The unit cells may also be coupled with each other with the sidewalls fluidly coupling the interior passageways of the unit cells with each other. Further, the sidewalls can separate the exterior volumes outside of the unit cells from the interior passageways of the unit cells such that a second fluid can flow through the exterior volumes and exchange heat with the first fluid flowing through the interiors of the unit cells without the first fluid and the second fluid mixing with each other.

Optionally, the sidewalls of the unit cells can include only smooth surfaces without linear or curved interfaces between the surfaces. Optionally, the sidewalls of the unit cells can include only multifaceted planar surfaces that intersect each other along linear interfaces. Optionally, the unit cells can be coupled together in a repeating pattern. Optionally, the unit cells can be coupled together to form a manifold portion, a first core portion, a redirection portion, and a second core portion. The manifold portion can be configured to receive the first fluid into the interior passageways of the unit cells and to receive the second fluid into the exterior volumes between the unit cells. The first core portion can be configured to direct the first fluid and the second fluid from the manifold portion toward the redirection portion. The redirection portion can be configured to change a direction of flow of the first fluid and flow the second fluid. The second core portion can be configured to direct the flow of the first fluid from the redirection portion back to the manifold portion and to direct the flow of the second fluid from the redirection portion back to the manifold portion. Optionally, the sidewalls of the unit cells can define polygon shaped openings as the openings into and out of the unit cells. Optionally, the sidewalls of the unit cells can define round openings as the openings into and out of the unit cells.

In another aspect, a heat exchanger is provided that can include furcating unit cells coupled with each other. Each of the unit cells can be elongated along an axis and include a sidewall that defines annular ring openings on opposite ends of the unit cell along the axis. The sidewall also can define undulating annular rings between the annular ring openings and axially separated from each other along the axis. The sidewall can further define angled openings into the unit cell both above and below each of the undulating annular rings. At least a first opening of the annular ring openings and the angled openings can be configured to be an inlet to receive a first fluid into the unit cell and at least a second opening of the annular ring openings and the angled openings configured to be an outlet through which the first fluid exits the unit cell. The sidewall can also define interior passageways through an interior of the unit cell that direct the first fluid into the unit cell and divide flow of the first fluid into separate flows through the interior passageways and out of the unit cell.

Optionally, the unit cells can be coupled with each other with the sidewalls of the unit cells separating exterior volumes outside of the unit cells from the interior passageways of the unit cells. Additionally, the unit cells can be coupled with each other with the sidewalls fluidly coupling the interior passageways of the unit cells with each other. Optionally, the interior passageways of each of the unit cells can be intertwined with each other through interiors of the unit cells. Optionally, the sidewalls can separate the interior passageways of the unit cells from the each other such that the first fluid flows through first interior passageways of the interior passageways with the second fluid flowing through second interior passageways of the interior passageways without the first fluid and the second fluid mixing with each other. Optionally, the sidewalls of the unit cells can include only smooth surfaces without linear or curved interfaces between the surfaces. Optionally, the sidewalls of the unit cells can include only multifaceted planar surfaces that intersect each other along linear interfaces. Optionally, the unit cells can be coupled together in a repeating pattern. Optionally, the unit cells can be coupled together to form a manifold portion, a first core portion, a redirection portion, and a second core portion. The manifold portion can be configured to receive the first fluid into the interior passage ways of the unit cells and to receive the second fluid into the exterior volumes between the unit cells. The first core portion can be configured to direct the first fluid and the second fluid from the manifold portion toward the redirection portion. The redirection portion can be configured to change a direction of flow of the first fluid and flow the second fluid. The second core portion can be configured to direct the flow of the first fluid from the redirection portion back to the manifold portion and to direct the flow of the second fluid from the redirection portion back to the manifold portion.

In one or more embodiments, a heat exchanger is provided that can include furcating unit cells coupled with each other. Each of the unit cells can include a sidewall that defines several openings into an interior of the unit cell. At least a first opening of the openings can be configured to be an inlet to receive a first fluid into the unit cell and at least a second opening of the openings configured to be an outlet through which the first fluid exits the unit cell. The sidewall can define interior passageways through the interior of the unit cell that direct the first fluid into the unit cell and divide flow of the first fluid into separate flows through the interior passageways and out of the unit cell. The sidewall of each of the unit cells can be shaped to divide a first flow of the first fluid inside the unit cell into at least a second, third, and fourth flow of the first fluid within the unit cell and out of the unit cell.

Optionally, the unit cells can be coupled with each other with the sidewalls of the unit cells separating exterior volumes outside of the unit cells from the interior passageways of the unit cells. The unit cells can be coupled with each other with the sidewalls fluidly coupling the interior passageways of the unit cells with each other. The sidewalls can separate the exterior volumes outside of the unit cells from the interior passageways of the unit cells such that a second fluid can flow through the exterior volumes and exchange heat with the first fluid flowing through the interiors of the unit cells without the first fluid and the second fluid mixing with each other. Optionally, the sidewall of each of the unit cells can divide the first flow of the first fluid into the second flow, the third flow, and the fourth flow of the first fluid with the first flow, the second flow, the third flow, and the fourth flow orthogonally oriented with respect to each other. Optionally, the sidewall of each of the unit cells can divide the first flow of the first fluid into the second flow, the third flow, and the fourth flow of the first fluid with the first flow, the second flow, the third flow, and the fourth flow oriented along acute angles with respect to each other. Optionally, the interior passageways can be defined by the sidewall of each of the unit cells are first interior passageways. The sidewall of each unit cell can also define second interior passageways through the interior of the unit cell with the first interior passageways and the second interior passageways intertwined with each other.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A heat exchanger comprising:
   an inner wall;
   a first core portion; and
   a second core portion, each of the first core portion and the second core portion comprising furcating unit cells coupled with each other and surrounding the inner wall, each of the furcating unit cells elongated along an axis and comprising:
      a sidewall that defines annular ring openings on opposite ends of a furcating unit cell along the axis, the sidewall also defining at least one undulating annular ring between the annular ring openings and axially separated from each other along the axis, the sidewall defining angled openings into the furcating unit cell both above and below the at least one undulating annular ring;
      at least a first opening of each of the annular ring openings and the angled openings configured to be an inlet to receive a first fluid into the furcating unit cell;
      at least a second opening of each of the annular ring openings and the angled openings configured to be an outlet through which the first fluid exits the furcating unit cell; and
      interior passageways through an interior of the furcating unit cell that direct the first fluid into the furcating unit cell, divide flow of the first fluid into separate flows through the interior passageways, and out of the furcating unit cell, wherein:
   the inner wall separates the first core portion from the second core portion, wherein the first fluid and a second fluid flow along both sides of the inner wall, and the inner wall prevents the first fluid from flowing through the inner wall.

2. The heat exchanger of claim 1, wherein the at least one undulating annular ring comprises one undulating annular ring between the annular ring openings.

3. The heat exchanger of claim 1, wherein the at least one undulating annular ring comprises two or more undulating annular rings between the annular ring openings.

4. The heat exchanger of claim 1, wherein the annular ring openings are disposed radially farther from the axis than the at least one undulating annular ring.

5. The heat exchanger of claim 1, wherein the annular ring openings are disposed radially closer to the axis than the at least one undulating annular ring.

6. The heat exchanger of claim 1, wherein the at least one undulating annular ring comprises waves or undulations that partially extend around the angled openings.

7. The heat exchanger of claim 1, wherein the furcating unit cells are fluidly coupled together with the sidewall of the furcating unit cell separating exterior volumes outside of the furcating unit cells from the interior passageways of the furcating unit cells.

8. The heat exchanger of claim 7, wherein the interior passageways are intertwined with each other through interiors of the furcating unit cells.

9. The heat exchanger of claim 8, wherein the sidewall divides flow of the first fluid into separate orthogonal flows through the interior passageways and out of the furcating unit cells.

10. The heat exchanger of claim 1, wherein the sidewall of the furcating unit cells include only smooth surfaces without linear or curved interfaces between the sidewall.

11. The heat exchanger of claim 1, wherein the sidewall of the furcating unit cells include only multifaceted planar surfaces that intersect each other along linear interfaces.

12. The heat exchanger of claim 1, wherein the furcating unit cells are coupled together in a repeating pattern.

13. The heat exchanger of claim 1, wherein the furcating unit cells are coupled together to form a manifold portion and a redirection portion, the manifold portion configured to receive the first fluid into the interior passageways of the furcating unit cells and to receive the second fluid into exterior volumes between the furcating unit cells, the first core portion configured to direct the first fluid and the second fluid from the manifold portion toward the redirection portion, the redirection portion configured to change a direction of flow of the first fluid and flow the second fluid, and the second core portion configured to direct the flow of the first fluid from the redirection portion back to the manifold portion and to direct the flow of the second fluid from the redirection portion back to the manifold portion.

14. A heat exchanger comprising:
   an inner wall;
   a first core portion; and
   a second core portion, each of the first core portion and the second core portion comprising furcating unit cells coupled with each other and surrounding the inner wall, each of the furcating unit cells elongated along an axis and comprising:
      a sidewall that defines annular ring openings on opposite ends of a furcating unit cell along the axis, the sidewall also defining at least one undulating annular ring between the annular ring openings and axially separated from each other along the axis, the sidewall defining angled openings into the furcating unit cell both above and below the at least one undulating annular ring, wherein the at least one undulating annular ring comprises waves or undulations that partially extend around the angled openings;

at least a first opening of each of the annular ring openings and the angled openings configured to be an inlet to receive a first fluid into the furcating unit cell;

at least a second opening of each of the annular ring openings and the angled openings configured to be an outlet through which the first fluid exits the furcating unit cell; and interior passageways through an interior of the furcating unit cell that direct the first fluid into the furcating unit cell, divide flow of the first fluid into separate flows through the interior passageways, and out of the furcating unit cell, wherein:

the furcating unit cells are coupled together to form a manifold portion and a redirection portion, the manifold portion configured to receive the first fluid into the interior passageways of the furcating unit cells and to receive the second fluid into exterior volumes between the furcating unit cells, the first core portion configured to direct the first fluid and the second fluid from the manifold portion toward the redirection portion, the redirection portion configured to change a direction of flow of the first fluid and flow the second fluid, and the second core portion configured to direct the flow of the first fluid from the redirection portion back to the manifold portion and to direct the flow of the second fluid from the redirection portion back to the manifold portion;

the furcating unit cells are coupled together in a repeating pattern; and the inner wall separates the first core portion from the second core portion, wherein the first fluid and a second fluid flow along both sides of the inner wall, and the inner wall prevents the first fluid from flowing through the inner wall.

15. The heat exchanger of claim 14, the manifold portion comprising a first manifold portion and a second manifold portion, wherein the first manifold portion includes a first fluid inlet and the second manifold portion includes a second fluid inlet.

16. The heat exchanger of claim 15, wherein the first manifold portion includes a second fluid outlet and the second manifold portion includes a first fluid outlet.

17. The heat exchanger of claim 14, wherein the furcating unit cells are coupled together in a repeating pattern.

18. The heat exchanger of claim 14, wherein the annular ring openings are disposed radially farther from the axis than the at least one undulating annular ring.

19. The heat exchanger of claim 14, wherein the annular ring openings are disposed radially closer to the axis than the at least one undulating annular ring.

20. A heat exchanger comprising:

an inner wall;

a first core portion; and a second core portion, each of the first core portion and the second core portion comprising furcating unit cells coupled with each other and surrounding the inner wall, each of the furcating unit cells elongated along an axis and comprising:

a sidewall that defines annular ring openings on opposite ends of a furcating unit cell along the axis, the sidewall also defining at least one undulating annular ring between the annular ring openings and axially separated from each other along the axis, the sidewall defining angled openings into the furcating unit cell both above and below the at least one undulating annular ring, wherein the at least one undulating annular ring comprises waves or undulations that partially extend around the angled openings;

at least a first opening of each of the annular ring openings and the angled openings configured to be an inlet to receive a first fluid into the furcating unit cell;

at least a second opening of each of the annular ring openings and the angled openings configured to be an outlet through which the first fluid exits the furcating unit cell; and interior passageways through an interior of the furcating unit cell that direct the first fluid into the furcating unit cell, divide flow of the first fluid into separate flows through the interior passageways, and out of the furcating unit cell, wherein:

the furcating unit cells are fluidly coupled together with the sidewall of the furcating unit cell separating exterior volumes outside of the furcating unit cells from the interior passageways of the furcating unit cells;

the furcating unit cells are coupled together in a repeating pattern and the inner wall separates the first core portion from the second core portion, wherein the first fluid and a second fluid flow along both sides of the inner wall, and the inner wall prevents the first fluid from flowing through the inner wall.

* * * * *